US012750851B2

(12) United States Patent
Bai et al.

(10) Patent No.: US 12,750,851 B2
(45) Date of Patent: Sep. 29, 2026

(54) UPDATING A TRANSMISSION CONFIGURATION INDICATOR FOR A COMPONENT CARRIER LIST

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 329 days.

(21) Appl. No.: 18/352,067

(22) Filed: Jul. 13, 2023

(65) Prior Publication Data

US 2024/0107536 A1 Mar. 28, 2024

Related U.S. Application Data

(60) Provisional application No. 63/377,269, filed on Sep. 27, 2022.

(51) Int. Cl.
*H04W 72/20* (2023.01)
*H04L 5/00* (2006.01)

(52) U.S. Cl.
CPC ............. *H04W 72/20* (2023.01); *H04L 5/001* (2013.01); *H04L 5/0055* (2013.01)

(58) Field of Classification Search
CPC ...... H04W 72/20; H04L 5/001; H04L 5/0055; H04L 5/0053
USPC .......................................................... 370/329
See application file for complete search history.

(56) References Cited

U.S. PATENT DOCUMENTS

2020/0053820 A1* 2/2020 Chin .................... H04W 72/569
2023/0319839 A1* 10/2023 Nilsson ................. H04L 5/0053 370/329

OTHER PUBLICATIONS

Xiaomi, "Remaining issues on multi-beam operation enhancement", May 9-20, 2022, R1-2203771. (From Applicant's IDS) (Year: 2022).*
International Search Report and Written Opinion—PCT/US2023/072096—ISA/EPO—Nov. 21, 2023.

(Continued)

*Primary Examiner* — Mang Hang Yeung
(74) *Attorney, Agent, or Firm* — Harrity & Harrity, LLP

(57) ABSTRACT

Various aspects of the present disclosure generally relate to wireless communication. In some aspects, a user equipment (UE) may receive a plurality of downlink control information (DCI) communications, associated with a first component carrier and a second component carrier, that indicate a plurality of respective transmission configuration indicator (TCI) states, wherein the first component carrier and the second component carrier are included in a same component carrier list. The UE may transmit a plurality of acknowledgement (ACK) messages via a plurality of respective physical uplink control channel (PUCCH) transmissions that are included in a single PUCCH or in overlapping PUCCHs. The UE may apply a TCI update to at least one of the first component carrier or the second component carrier based at least in part on a TCI state of the plurality of TCI states and in accordance with one or more rules. Numerous other aspects are described.

30 Claims, 15 Drawing Sheets

(56) References Cited

OTHER PUBLICATIONS

Xiaomi: "Remaining Issues on Multi-beam Operation Enhancement", 3GPP TSG RAN WG1 #109-e, R1-2203771, 3rd Generation Partnership Project (3GPP), Mobile Competence Centre, 650, Route Des Lucioles, F-06921 Sophia-Antipolis Cedex, France , vol. RAN WG1, No. e-meeting, May 9, 2022-May 20, 2022, Apr. 25, 2022, 7 Pages, XP052137866, p. 5-p. 6.

* cited by examiner

UPDATING A TRANSMISSION CONFIGURATION INDICATOR FOR A COMPONENT CARRIER LIST

CROSS-REFERENCE TO RELATED APPLICATION

This Patent Application claims priority to U.S. Provisional Patent Application No. 63/377,269, filed on Sep. 27, 2022, entitled "UPDATING A TRANSMISSION CONFIGURATION INDICATOR FOR A COMPONENT CARRIER LIST," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for updating a transmission configuration indicator for a component carrier list.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
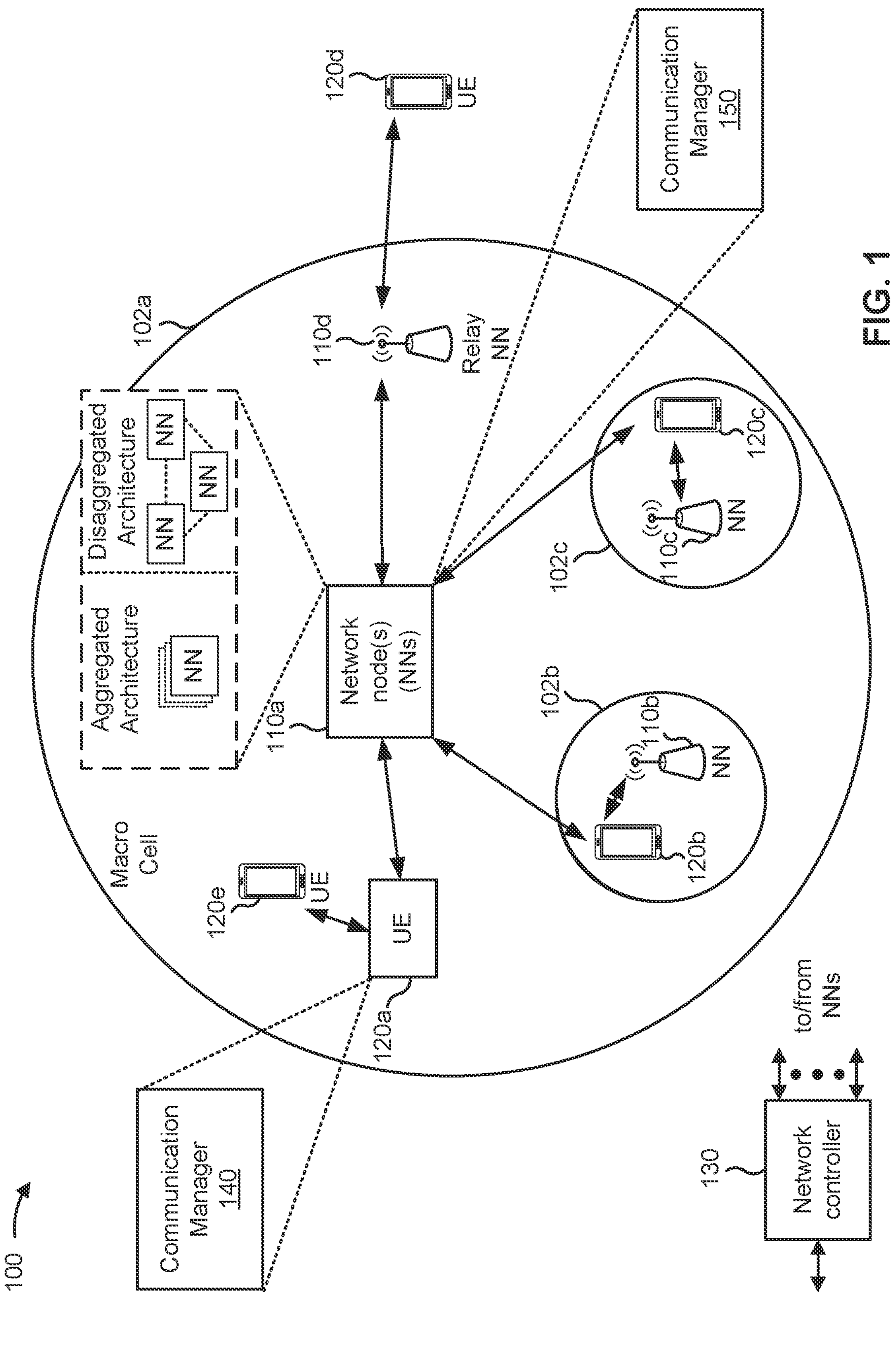
FIG. 1 is a diagram illustrating an example of a wireless network, in accordance with the present disclosure.

Some aspects described herein relate to a method of wireless communication performed by a user equipment (UE). The method may include receiving a plurality of downlink control information (DCI) communications, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list. The method may include transmitting a plurality of acknowledgement (ACK) messages via a plurality of respective physical uplink control channel (PUCCH) transmissions, wherein the plurality of PUCCH transmissions are included in a single PUCCH or in overlapping PUCCHs. The method may include applying a TCI update to at least one of the first component carrier or the second component carrier based at least in part on a TCI state of the plurality of TCI states and in accordance with one or more rules.

Some aspects described herein relate to a method of wireless communication performed by a network node. The method may include transmitting a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The method may include receiving a plurality of ACK messages via a plurality of respective PUCCH transmissions, wherein the plurality of PUCCH transmissions are included in a single PUCCH or in overlapping PUCCHs. The method may include applying a TCI update to at least one of the first component carrier or the second component carrier based at least in part on a TCI state of the plurality of TCI states and in accordance with one or more rules.

Some aspects described herein relate to an apparatus for wireless communication performed by a UE. The apparatus may include a memory and one or more processors, coupled to the memory. The one or more processors may be configured to receive a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The one or more processors may be configured to transmit a plurality of ACK messages via a plurality of respective PUCCH transmissions, wherein the plurality of PUCCH transmissions are included in a single PUCCH or in overlapping PUCCHs. The one or more processors may be configured to apply a TCI update to at least one of the first component carrier or the second component carrier based at least in part on a TCI state of the plurality of TCI states and in accordance with one or more rules.

Some aspects described herein relate to an apparatus for wireless communication performed by a network node. The apparatus may include a memory and one or more processors, coupled to the memory. The one or more processors may be configured to transmit a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The one or more processors may be configured to receive a plurality of ACK messages via a plurality of respective PUCCH transmissions, wherein the plurality of PUCCH transmissions are included in a single PUCCH or in overlapping PUCCHs. The one or more processors may be configured to apply a TCI update to at least one of the first component carrier or the second component carrier based at least in part on a TCI state of the plurality of TCI states and in accordance with one or more rules.

Some aspects described herein relate to a non-transitory computer-readable medium that stores a set of instructions for wireless communication by a UE. The set of instructions, when executed by one or more processors of the UE, may cause the UE to receive a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The set of instructions, when executed by one or more processors of the UE, may cause the UE to transmit a plurality of ACK messages via a plurality of respective PUCCH transmissions, wherein the plurality of PUCCH transmissions are included in a single PUCCH or in overlapping PUCCHs. The set of instructions, when executed by one or more processors of the UE, may cause the UE to apply a TCI update to at least one of the first component carrier or the second component carrier based at least in part on a TCI state of the plurality of TCI states and in accordance with one or more rules.

Some aspects described herein relate to a non-transitory computer-readable medium that stores a set of instructions for wireless communication by a network node. The set of instructions, when executed by one or more processors of the network node, may cause the network node to transmit a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The set of instructions, when executed by one or more processors of the network node, may cause the network node to receive a plurality of ACK messages via a plurality of respective PUCCH transmissions, wherein the plurality of PUCCH transmissions are included in a single PUCCH or in overlapping PUCCHs. The set of instructions, when executed by one or more processors of the network node, may cause the network node to apply a TCI update to at least one of the first component carrier or the second component carrier based at least in part on a TCI state of the plurality of TCI states and in accordance with one or more rules.

Some aspects described herein relate to an apparatus for wireless communication. The apparatus may include means for receiving a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The apparatus may include means for transmitting a plurality of ACK messages via a plurality of respective PUCCH transmissions, wherein the plurality of PUCCH transmissions are included in a single PUCCH or in overlapping PUCCHs. The apparatus may include means for applying a TCI update to at least one of the first component carrier or the second component carrier based at least in part on a TCI state of the plurality of TCI states and in accordance with one or more rules.

Some aspects described herein relate to an apparatus for wireless communication. The apparatus may include means for transmitting a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The apparatus may include means for receiving a plurality of ACK messages via a plurality of respective PUCCH transmissions, wherein the plurality of PUCCH transmissions are included in a single PUCCH or in overlapping PUCCHs. The apparatus may include means for applying a TCI update to at least one of the first component carrier or the second component carrier based at least in part on a TCI state of the plurality of TCI states and in accordance with one or more rules.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a plurality of downlink control information (DCI) communications, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list; transmit a plurality of acknowledgement (ACK) messages via a plurality of respective PUCCH transmissions, wherein the plurality of PUCCH transmissions are included in a single PUCCH or in overlapping PUCCHs; and apply a TCI update to at least one of the first component carrier or the second component carrier based at least in part on a TCI state of the plurality of TCI states and in accordance with one or more rules. Additionally, or alternatively, the communication manager 140 may perform one or more other operations described herein.

In some aspects, the network node 110 may include a communication manager 150. As described in more detail elsewhere herein, the communication manager 150 may transmit a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list; receive a plurality of ACK messages via a plurality of respective PUCCH transmissions, wherein the plurality of PUCCH transmissions are included in a single PUCCH or in overlapping PUCCHs; and apply a TCI update to at least one of the first component carrier or the second component carrier based at least in part on a TCI state of the plurality of TCI states and in accordance with one or more rules. Additionally, or alternatively, the communication manager 150 may perform one or more other operations described herein.

As indicated above, FIG. 1 is provided as an example. Other examples may differ from what is described with regard to FIG. 1.

Figure 2:
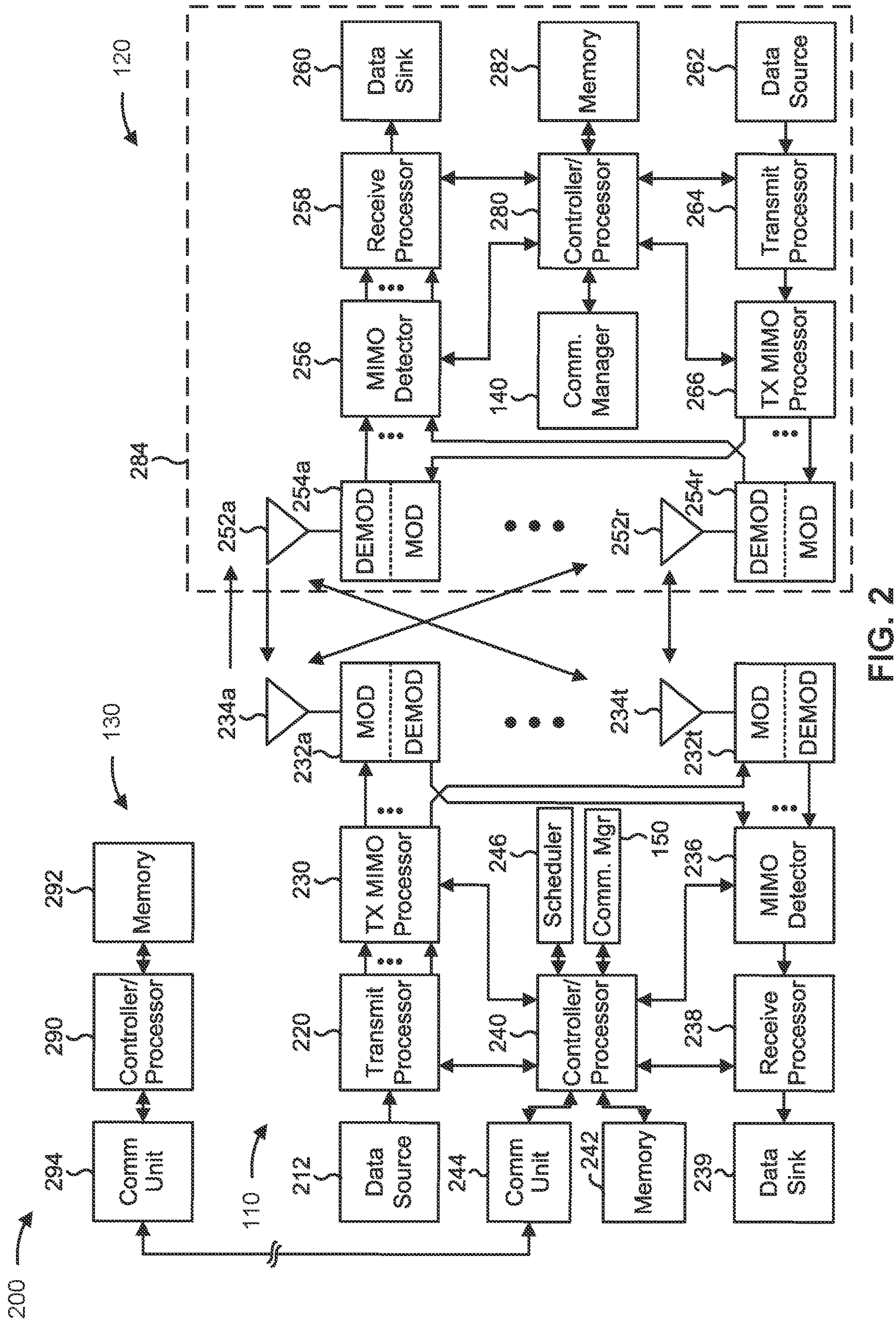
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-15).

The controller/processor 240 of the network node 110, the controller/processor 280 of the UE 120, and/or any other component(s) of FIG. 2 may perform one or more techniques associated with updating a TCI for a component carrier list, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list; means for transmitting a plurality of ACK messages via a plurality of respective PUCCH transmissions, wherein the plurality of PUCCH transmissions are included in a single PUCCH or in overlapping PUCCHs; and/or means for applying a TCI update to at least one of the first component carrier or the second component carrier based at least in part on a TCI state of the plurality of TCI states and in accordance with one or more rules. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list; means for receiving a plurality of ACK messages via a plurality of respective PUCCH transmissions, wherein the plurality of PUCCH transmissions are included in a single PUCCH or in overlapping PUCCHs; and/or means for applying a TCI update to at least one of the first component carrier or the second component carrier based at least in part on a TCI state of the plurality of TCI states and in accordance with one or more rules. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
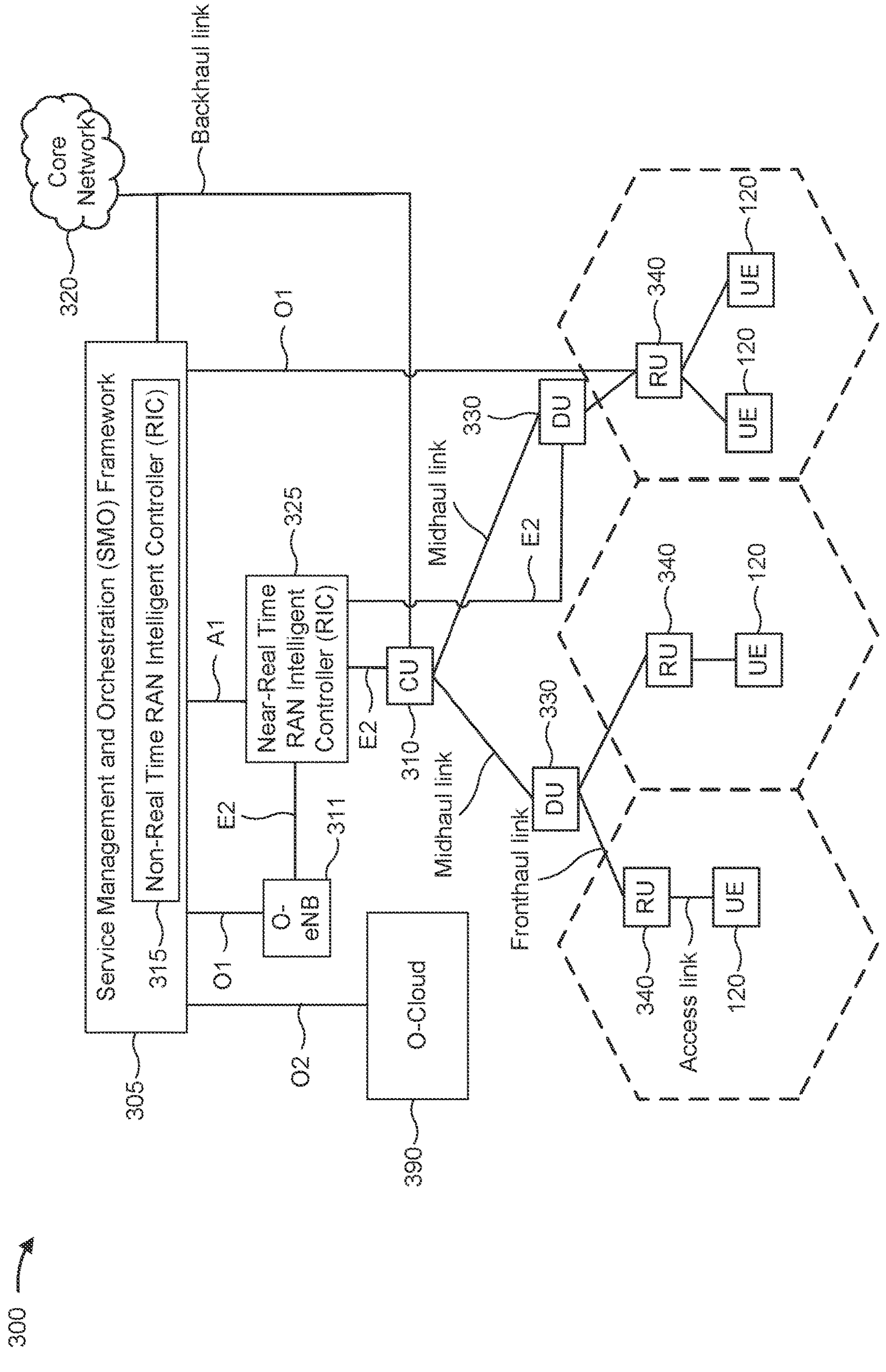
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
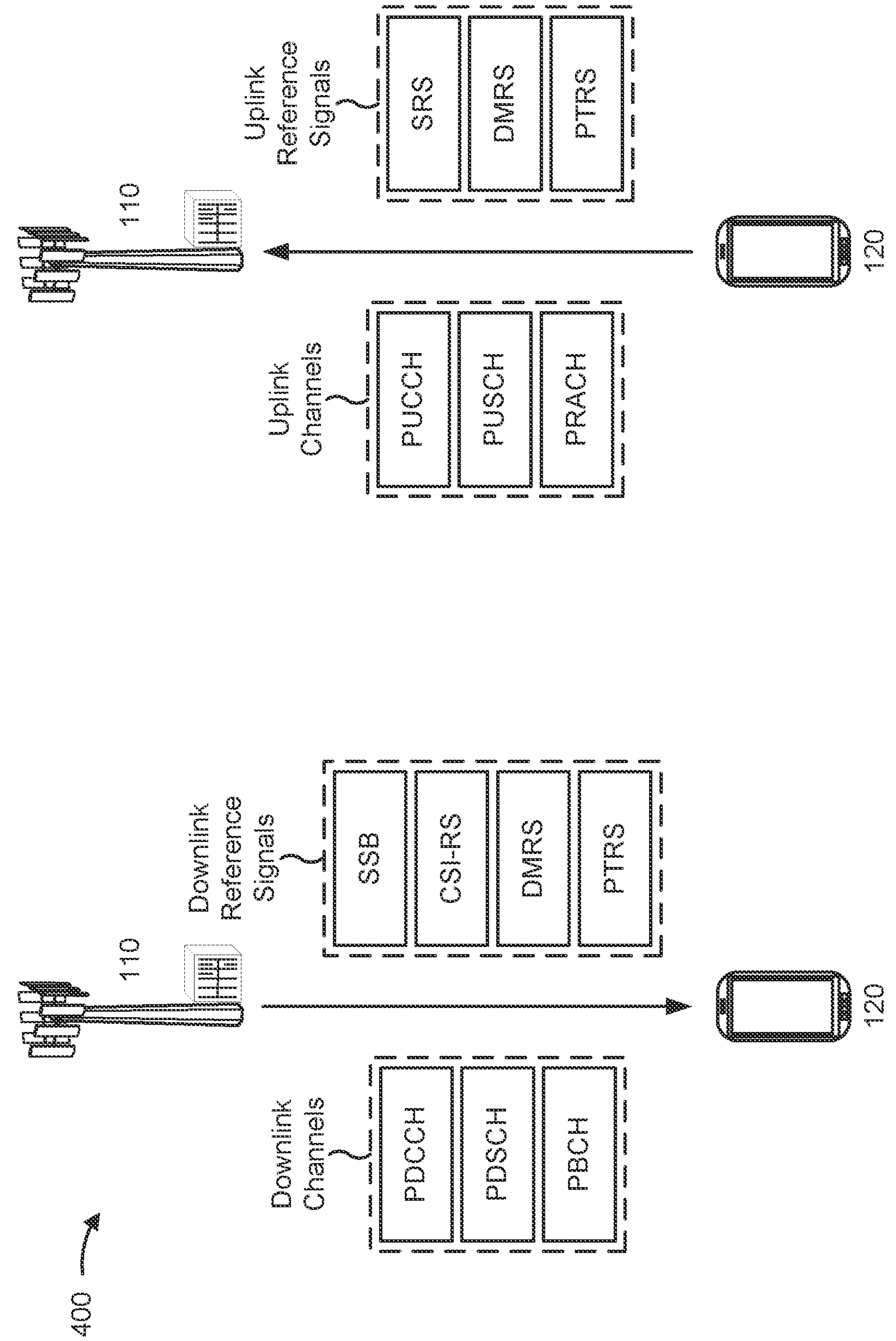
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit ACK or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RS s. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
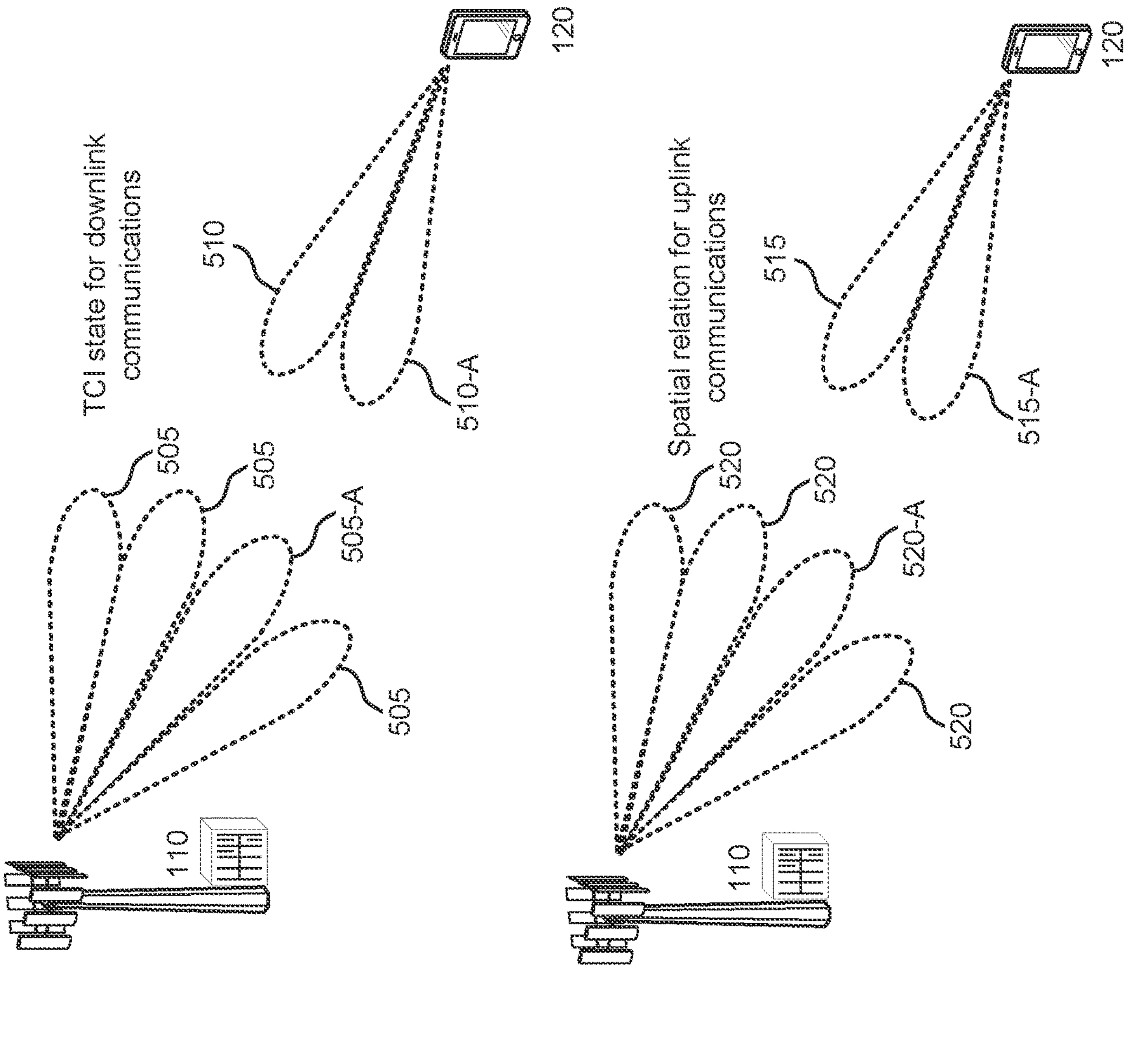
FIG. 5 is a diagram illustrating an example of using beams for communications between a network node and a UE, in accordance with the present disclosure.

FIG. 5 is a diagram illustrating an example 500 of using beams for communications between a network node and a UE, in accordance with the present disclosure. As shown in FIG. 5, a network node 110 and a UE 120 may communicate with one another.

The network node 110 may transmit to UEs 120 located within a coverage area of the network node 110. The network node 110 and the UE 120 may be configured for beamformed communications, where the network node 110 may transmit in the direction of the UE 120 using a directional network node (NN) transmit beam (e.g., a BS transmit beam), and the UE 120 may receive the transmission using a directional UE receive beam. Each NN transmit beam may have an associated beam ID, beam direction, or beam symbols, among other examples. The network node 110 may transmit downlink communications via one or more NN transmit beams 505.

The UE 120 may attempt to receive downlink transmissions via one or more UE receive beams 510, which may be configured using different beamforming parameters at receive circuitry of the UE 120. The UE 120 may identify a particular NN transmit beam 505, shown as NN transmit beam 505-A, and a particular UE receive beam 510, shown as UE receive beam 510-A, that provide relatively favorable performance (for example, that have a best channel quality of the different measured combinations of NN transmit beams 505 and UE receive beams 510). In some examples, the UE 120 may transmit an indication of which NN transmit beam 505 is identified by the UE 120 as a preferred NN transmit beam, which the network node 110 may select for transmissions to the UE 120. The UE 120 may thus attain and maintain a beam pair link (BPL) with the network node 110 for downlink communications (for example, a combination of the NN transmit beam 505-A and the UE receive beam 510-A), which may be further refined and maintained in accordance with one or more established beam refinement procedures.

A downlink beam, such as an NN transmit beam 505 or a UE receive beam 510, may be associated with a transmission configuration indication (TCI) state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each NN transmit beam 505 may be associated with a synchronization signal block (SSB), and the UE 120 may indicate a preferred NN transmit beam 505 by transmitting uplink transmissions in resources of the SSB that are associated with the preferred NN transmit beam 505. A particular SSB may have an associated TCI state (for example, for an antenna port or for beamforming). The network node 110 may, in some examples, indicate a downlink NN transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the network node 110 indicating an NN transmit beam 505 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a physical downlink shared channel (PDSCH). The set of activated TCI states for downlink control channel communications may correspond to beams that the network node 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional UE transmit beam, and the network node 110 may receive the transmission using a directional NN receive beam. Each UE transmit beam may have an associated beam ID, beam direction, or beam symbols, among other examples. The UE 120 may transmit uplink communications via one or more UE transmit beams 515.

The network node 110 may receive uplink transmissions via one or more NN receive beams 520 (e.g., BS receive beams). The network node 110 may identify a particular UE transmit beam 515, shown as UE transmit beam 515-A, and a particular NN receive beam 520, shown as NN receive beam 520-A, that provide relatively favorable performance (for example, that have a best channel quality of the different measured combinations of UE transmit beams 515 and NN receive beams 520). In some examples, the network node 110 may transmit an indication of which UE transmit beam 515 is identified by the network node 110 as a preferred UE transmit beam, which the network node 110 may select for transmissions from the UE 120. The UE 120 and the network node 110 may thus attain and maintain a BPL for uplink communications (for example, a combination of the UE transmit beam 515-A and the NN receive beam 520-A), which may be further refined and maintained in accordance with one or more established beam refinement procedures. An uplink beam, such as a UE transmit beam 515 or an NN receive beam 520, may be associated with a spatial relation. A spatial relation may indicate a directionality or a characteristic of the uplink beam, similar to one or more QCL properties, as described above.

As indicated above, FIG. 5 is provided as an example. Other examples may differ from what is described with respect to FIG. 5.

Figure 6:
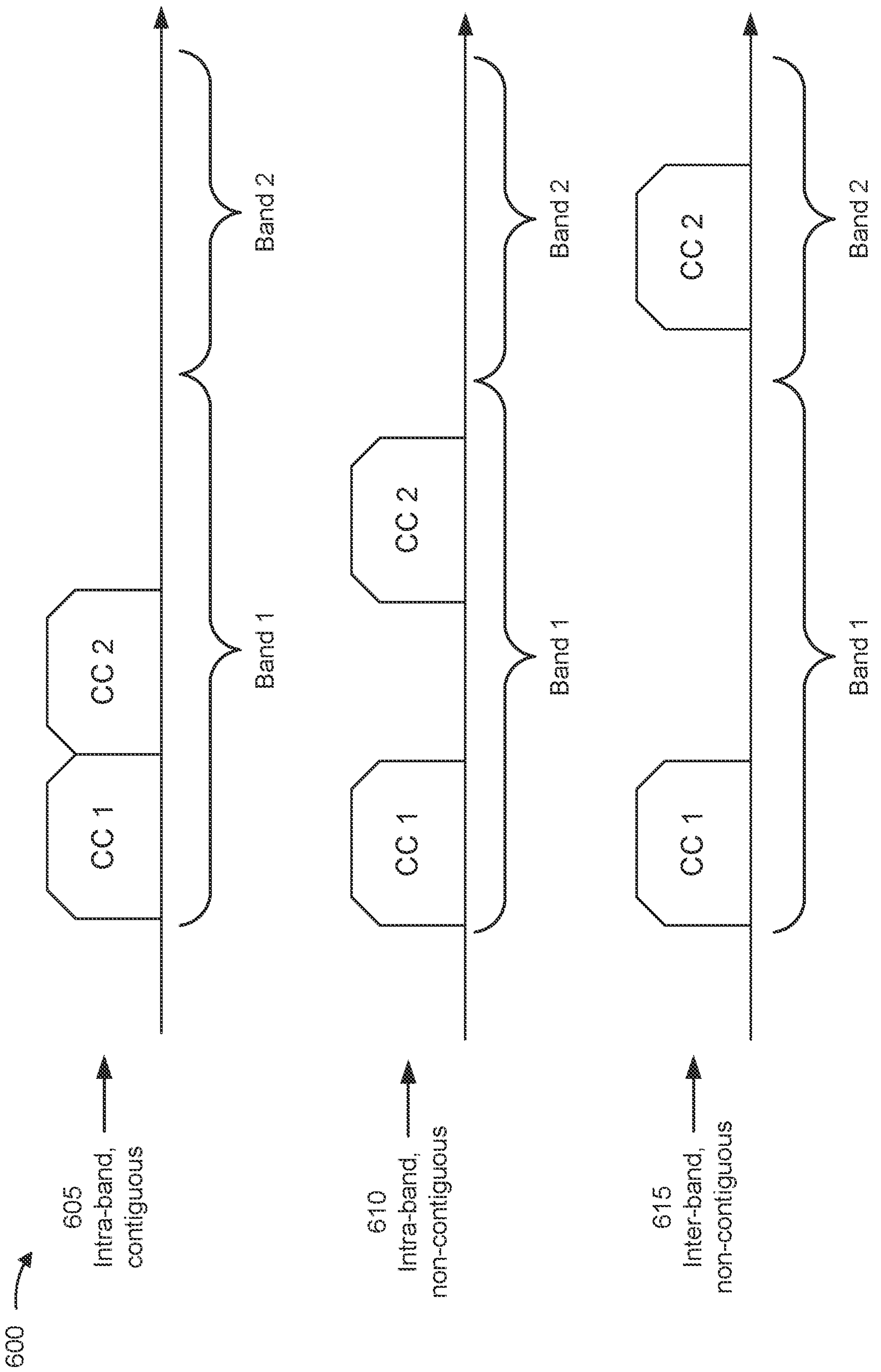
FIG. 6 is a diagram illustrating examples of carrier aggregation, in accordance with the present disclosure.

FIG. 6 is a diagram illustrating examples 600 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, DCI, and/or another signaling message.

As shown by reference number 605, in some aspects, carrier aggregation may be configured in an intra-band contiguous mode where the aggregated carriers are contiguous to one another and are in the same band. As shown by reference number 610, in some aspects, carrier aggregation may be configured in an intra-band non-contiguous mode where the aggregated carriers are non-contiguous to one another and are in the same band. As shown by reference number 615, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 6 is provided as an example. Other examples may differ from what is described with regard to FIG. 6.

Figure 7:
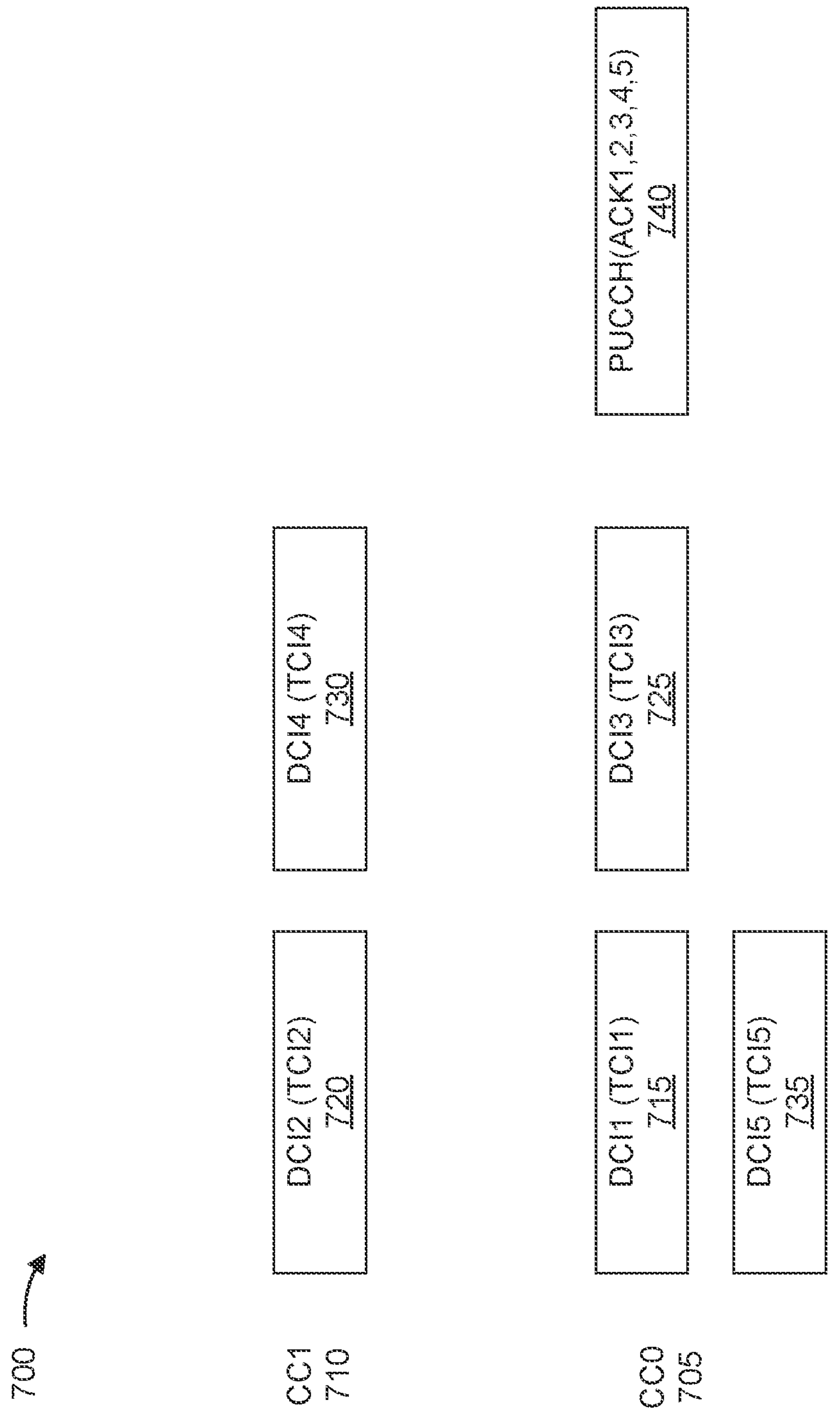
FIG. 7 is a diagram illustrating an example of transmission configuration indicator (TCI) updating with overlapping downlink control information, in accordance with the present disclosure.

FIG. 7 is a diagram illustrating an example 700 of TCI updating with overlapping DCI, in accordance with the present disclosure.

In some cases, DCI may indicate one or more beams to be used by the UE 120 and/or the network node 110. This may be referred to as DCI based beam indication. For DCI based beam indication, a TCI state (such as an updated TCI state) may be applied in a first slot that is at least X ms or at least Y symbols after a last symbol of an ACK message that corresponds to the beam indication, where the beam indication is a downlink beam indication, an uplink beam indication, or a joint (downlink and uplink) beam indication. The ACK may be a dedicated ACK, for example, when the DCI has no downlink assignment. Alternatively, the ACK may be an ACK that is used to schedule a PDSCH. The timing information (e.g., the X ms or Y symbols) may be configured in accordance with capability information associated with the UE 120. In some cases, when a common TCI state is applied among multiple component carriers, the X ms or Y symbols may be determined based at least in part on the component carrier having the smallest sub-carrier spacing (SCS). In some other cases, the beam indication may be a MAC control element (MAC-CE) based beam indication. For MAC-CE based beam indication, the indicated TCI may be activated 3 ms after the ACK that corresponds to the MAC-CE. In some cases, the TCI state may be applied to one or more channels or reference signals (e.g., once activated) as shown in Table 1.

TABLE 1

| TCI State Type | Mandatory | Optional (e.g., can be configured in RRC) |
|---|---|---|
| Separate DL TCI | UE dedicated PDCCH and PDSCH | Non-UE dedicated PDCCH and PDSCH, AP CSI-RS for CSI, AP CSI RS for beam management (BM) |
| Separate UL TCI | UE dedicated PUSCH (dynamic grant and configured grant based) and PUCCH | SRS for CB/non-codebook (NCB)/Antenna switching (AS), AP SRS for BM |
| Joint DL and UL TCI | UE dedicated PDCCH and PDSCH<br>UE dedicated PUSCH (dynamic grant and configured grant based) and PUCCH | Non-UE dedicated PDCCH and PDSCH, AP CSI-RS for CSI, AP CSI RS for BM<br>SRS for CB/NCB/ Antenna switching (AS), AP SRS for BM |

In some cases, DCI (such as DCI format 1_1 or 1_2) may be used to indicate a TCI state without scheduling any downlink assignment. For example, the DCI may be used to indicate the TCI state without scheduling any downlink assignment when a cyclic redundancy check (CRC) of the DCI is scrambled by a configured scheduling radio network temporary identifier (CS-RNTI), when a redundancy version (RV) field is set to all ones, when an MCS field is set to all ones, when a new data indicator (NDI) field is set to zero, and when a frequency domain resource allocation (FDRA) field is set to all zeros for FDRA type 0, all ones for FDRA type 1, or all zeros for dynamic switching. In some cases, a TCI field may be used to indicate the TCI state identifier (ID). In some cases, a PDSCH to hybrid automatic repeat request (HARQ) feedback timing indicator field may be used to indicate a time offset from the DCI to a corresponding ACK in the PUCCH. In some cases, such as for a type-1 HARQ-ACK codebook, a time domain resource allocation (TDRA) field may be used to derive a virtual PDSCH location, which may further be used to determine a location for the ACK in the HARQ-ACK codebook.

In some cases, the UE 120 may be configured with one or more component carrier lists, where each component carrier list indicates a plurality of component carriers. Component carriers on the same component carrier list may share the same TCI indication (e.g., TCI update) from the DCI or MAC-CE. In some cases, a component carrier may be included in only one component carrier list at a time. In one example, a first component carrier (CC0) and a second component carrier (CC1) may be configured on the same component carrier list. If the UE 120 receives a TCI update using a MAC-CE for CC0, the update may apply to both CC0 and CC1. Alternatively, if the UE 120 receives a DCI indicating a TCI update for CC0, the same TCI may be applied to both CC0 and CC1 for the TCI update. For example, the DCI update may be applied across multiple component carriers at a first slot that is Y symbols counting from a last symbol of the ACK corresponding to the DCI. In some cases, when component carriers have different SCS, the component carrier with the smallest SCS (e.g., the largest symbol length) may be used to determine the timeline for the DCI update.

As shown in the example 700, the UE 120 may receive a plurality of DCI communications associated with CC0 705 and CC1 710, such as DCI1 715, DCI2 720, DCI3 725, DCI4 730, and DCI5 735. Each of the DCI communications may indicate a TCI state. For example, DCI1 715 may indicate to apply TCI1, DCI2 720 may indicate to apply TCI2, DCI3 725 may indicate to apply TCI3, DCI4 730 may indicate to apply TCI4, and DCI5 735 may indicate to apply TCI5. At a first time, the UE 120 may receive DCI1 715 and DCI5 735 associated with CC0 705 and may receive DCI2 720 associated with CC1 710. Thus, DCI2 720, DCI1 715, and DCI5 735 may be overlapping during the first time. At a second time, the UE 120 may receive DCI3 725 associated with CC0 705 and may receive DCI4 730 associated with CC1 710. Thus, DCI4 730 and DCI3 725 may be overlapping during the second time. The UE 120 may transmit an ACK message corresponding to one or more of the received DCI communications. For example, the UE 120 may transmit ACK1, ACK2, ACK3, ACK4, and ACK5 (shown as ACK1, 2, 3, 4, 5) that respectively correspond to DCI1, DCI2, DCI3, DCI4, and DCI5.

In some cases, ACK messages that are based at least in part on (e.g., sent in response to) DCI communications associated with multiple component carriers may be contained in the same PUCCH resource, such as PUCCH resource 740. When the component carriers are not included in a component carrier list, the UE 120 and/or the network node 110 may use a DCI that is received last in time to determine a TCI update. When multiple DCIs are received in the same symbol(s) of the component carrier, the UE 120 and/or the network node 110 may use a CORESET ID or a search space ID (that is used to receive the DCI) to determine the TCI update. In the example above, DCI3 725 and DCI4 730 may be the last received DCI communications associated with the component carriers and may overlap in time. Thus, the UE 120 and/or the network node 110 may determine a TCI update for CC0 and CC1 based at least in part on the CORESET ID or the search space ID of the DCI3 725 and the DCI4 730. For example, if DCI3 725 has a smaller CORESET ID than DCI4 730, TCI3 may be used for the TCI update. Alternatively, if DCI3 725 and DCI4 730 have the same CORESET ID, but DCI4 730 has a smaller search space ID than DCI3 725, TCI4 may be used for the TCI update. However, the existing rules described above may not apply when the component carriers are included in a same component carrier list. For example, the existing rules may not apply when the PUCCH or the PDCCH associated with the component carriers have repetition and/or may not apply when the last received DCI communications are associated with component carriers having different SCS. Thus, the UE 120 and the network node 110 may not be able to determine which TCI is to be used for the component carriers that are included in the same component carrier list.

Techniques and apparatuses are described herein for updating a TCI for a component carrier list. In some aspects, a network node may transmit, and a UE may receive, a plurality of DCI communications, associated with a first component carrier and a second component carrier, that indicate a plurality of respective TCI states, where each of the first component carrier and the second component carrier are associated with at least two DCI communications of the plurality of DCI communications, and where the first component carrier and the second component carrier are included in a same component carrier list. The UE may transmit, and the network node may receive, a plurality of ACK messages via a plurality of respective PUCCH transmissions, where the plurality of PUCCH transmissions are included in a single PUCCH or in overlapping PUCCHs. The UE and/or the network node may apply a TCI update to at least one of the first component carrier or the second component carrier based at least in part on a TCI state of the plurality of TCI states and in accordance with one or more rules. In some aspects, the plurality of DCI communications may include a select plurality of DCI communications that are associated with a plurality of respective ACK messages that are transmitted via a last PUCCH transmission of a plurality of PUCCH transmissions. In this case, the TCI state may correspond to a TCI state that is associated with a last DCI communication of the select plurality of DCI communications. In some other aspects, the plurality of DCI communications may include a first DCI communication and a second DCI communication that overlap in time and are associated with a plurality of respective ACK messages that are transmitted via a last PUCCH transmission of the plurality of PUCCH transmissions. In this case, the TCI state may be based at least in part on a component carrier identifier that is indicated by the first DCI communication or the second DCI communication.

As described above, ACK messages that are based at least in part on DCI communications and are associated with multiple component carriers may be contained in the same PUCCH resource. When the component carriers are not included in a component carrier list, the UE or the network node may use a DCI that is received last in time to determine a TCI update. When multiple DCIs are received in the same symbol of the component carrier, the UE or the network node may use a CORESET ID or a search space ID to determine the TCI update. However, the existing rules may not apply when the component carriers are included in a same component carrier list. Thus, the UE and the network node may not be able to determine which TCI is to be used for the component carriers that are included in the same component carrier list. Using the techniques and apparatuses described herein, the UE and the network node may determine a TCI update to be applied for multiple component carriers that are included in a component carrier list. The TCI update may be based at least in part on a select DCI communication of a plurality of DCI communications and one or more rules, where each of the DCI communications indicate to apply a particular TCI. Additional details are described herein.

As indicated above, FIG. 7 is provided as an example. Other examples may differ from what is described with regard to FIG. 7.

Figure 8:
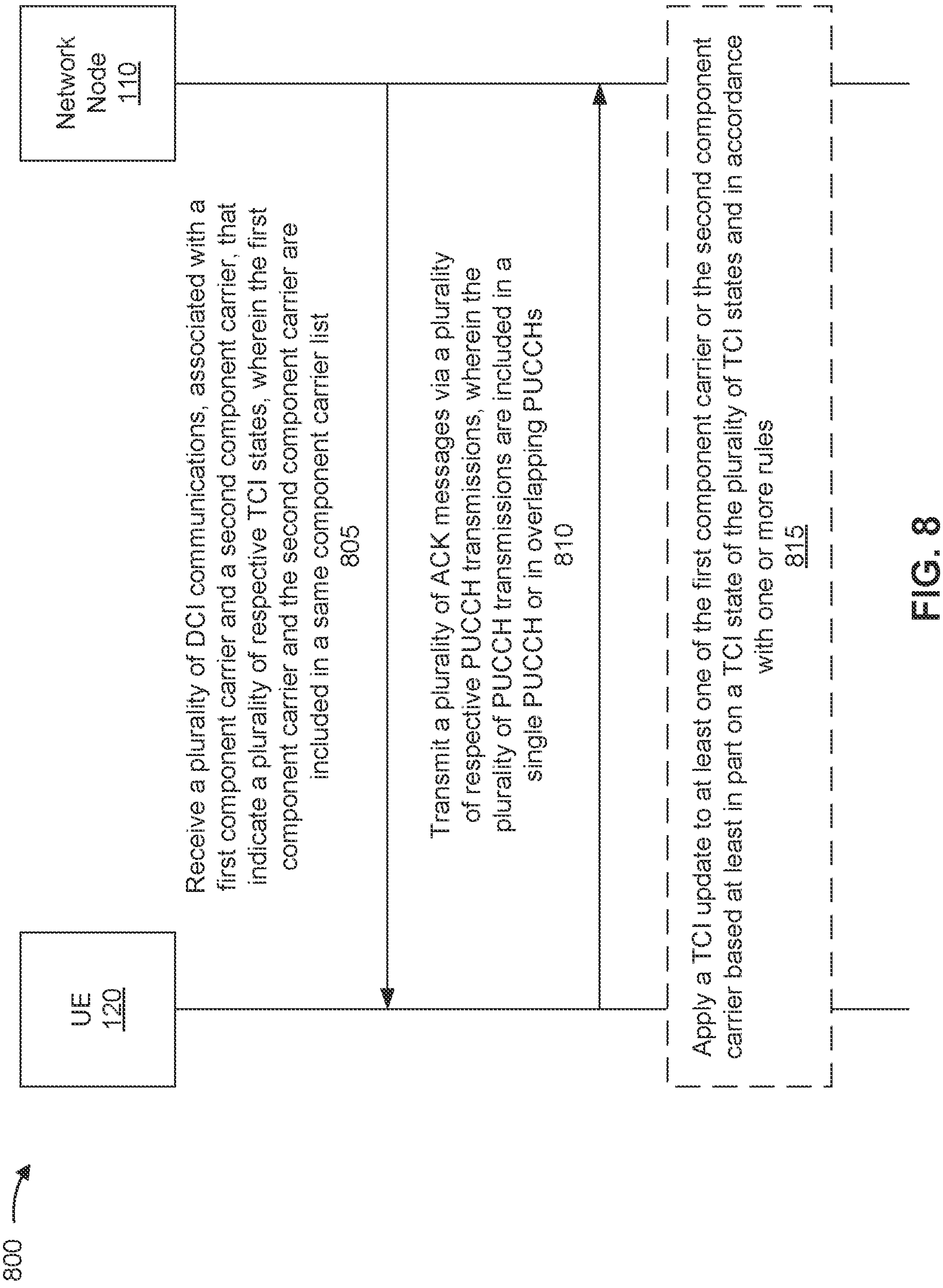
FIG. 8 is a diagram illustrating an example of updating a TCI for a component carrier list, in accordance with the present disclosure.

FIG. 8 is a diagram illustrating an example 800 of updating a TCI for a component carrier list, in accordance with the present disclosure. The UE 120 may communicate with the network node 110.

As shown by reference number 805, the network node 110 may transmit, and the UE 120 may receive, a plurality of DCI communications, associated with a first component carrier and a second component carrier, that indicate a plurality of respective TCI states. At least one DCI communication of the plurality of DCI communications is associated with the first component carrier and at least one other DCI communication of the plurality of DCI communications is associated with the second component carrier. The first component carrier and the second component carrier may be included in a same component carrier list. While the example 800 shows a first component carrier and a second component carrier included in a component carrier list, any number of component carriers may be included in the component carrier list.

In one example, the network node 110 may transmit, and the UE 120 may receive, a plurality of DCI communications that includes first DCI (DCI1), second DCI (DCI2), third DCI (DCI3), fourth DCI (DCI4), and fifth DCI (DCI5). A portion of the DCI communications may be associated with the first component carrier and another portion of the DCI communications may be associated with the second component carrier. For example, the first DCI, third DCI, and fifth DCI may be associated with the first component carrier and the second DCI and fourth DCI may be associated with the second component carrier. In some aspects, some of the DCI communications may be received at different times. For example, DCI1 and DCI2 may be received during a first time period, and DCI3 and DCI4 may be received during a second time period. In some aspects, one or more of the DCI communications may be received in multiple time periods. For example, a first repetition of DCI5 may be received during the first time period and a second repetition of DCI5 may be received during the second time period. In some aspects, each of the DCI communications may be associated with a respective TCI state. For example, the first DCI may indicate to apply a first TCI state (TCI1), the second DCI may indicate to apply a second TCI state (TCI2), the third DCI may indicate to apply a third TCI state (TCI3), the fourth DCI may indicate to apply a fourth TCI state (TCI4), and the fifth DCI may indicate to apply a fifth TCI state (TCI5). The TCI indicated in the DCI may be unified TCI. In some aspects, at least a portion of the DCI communications may indicate a CORESET identifier and/or a search space (SS) identifier. For example, the first DCI may indicate CORESET0 and the third DCI may indicate CORESET1 and SS3. In some aspects, different repetitions of the DCI may indicate different CORESET identifiers or search space identifiers. For example, the first repetition of DCI5 may indicate CORESET0 and SS1 while a second repetition of DCI5 may indicate CORESET1 and SS2.

As shown by reference number 810, UE 120 may transmit, and the network node 110 may receive, a plurality of ACK messages via a plurality of respective PUCCH transmissions. In some aspects, the plurality of PUCCH transmissions may be included in a single PUCCH. For example, the UE 120 may transmit a first ACK (ACK1) corresponding to the first DCI, a second ACK (ACK2) corresponding to the second DCI, a third ACK (ACK3) corresponding to the third DCI, a fourth ACK (ACK4) corresponding to the fourth DCI, and a fifth ACK (ACK5) corresponding to the fifth DCI. In this example, the ACKs (e.g., ACK1, 2, 3, 4, 5) may be transmitted in a single PUCCH message. In some other aspects, the plurality of PUCCH transmissions may be included in overlapping PUCCHs. For example, a portion of the ACKs (e.g., ACK 2, 4) may be transmitted in a first PUCCH and another portion of the ACKs (e.g., ACK1,3,5) may be transmitted in a second PUCCH that overlaps with the first PUCCH.

As shown by reference number 815, the UE 120 and/or the network node 110 may apply a TCI update to at least one of the first component carrier or the second component carrier based at least in part on a TCI state of the plurality of TCI states and in accordance with one or more rules. In some aspects, the one or more rules may be specific for component carriers that are included in a same component carrier list, and may be different from the existing rules described in connection with FIG. 7.

In some aspects, the one or more rules may indicate that a TCI update for a component carrier that is not included in a component carrier list is to be based at least in part on a last received DCI among all DCIs that are acknowledged (ACKed) in the same PUCCH associated with the component carrier. In one example, a third component carrier may not be included in the same component carrier list as the first component carrier and the second component carrier, and/or may not be included in any component carrier list. The UE 120 may receive a plurality of DCI communications associated with the third component carrier, and may transmit a plurality of ACK messages via a PUCCH, where each ACK message of the plurality of ACK messages corresponds to a respective DCI communication of the plurality of DCI communications. In this example, the one or more rules may indicate that the TCI state that is indicated by a last received DCI communication of the plurality of DCI communications is to be used for the TCI update for the third component carrier. The last received DCI communication may be the DCI communication of the plurality of DCI communications that has been received most recently. In another example, two or more DCI communications of the plurality of DCI communications may overlap (e.g., may be received in the same symbol) and may be the last received DCI communications of the plurality of DCI communications. In this case, the one or more rules may indicate to apply a TCI update that is determined based at least in part on a CORESET ID and/or a search space ID associated with the two or more overlapping DCI communications. For example, the one or more rules may indicate for the TCI update to be based at least in part on the TCI state associated with a DCI communication, of the two or more overlapping DCI communications, that is associated with the smallest CORESET ID or the smallest search space ID.

In some aspects, when a component carrier (such as the first component carrier and/or the second component carrier) is included in a component carrier list, the one or more rules may indicate that the TCI update for all component carriers included in the component carrier list is to be determined based at least in part on a last received DCI among all DCIs that are lastly ACKed in the same symbol or slot. The slot may be in the same PUCCH symbol. In one example, the UE 120 may perform a PUCCH transmission in a first PUCCH that includes ACK1, ACK2, ACK3, ACK4, and ACK5 that respectfully correspond to DCI1, DCI2, DCI3, DCI4, and DCI5. In this example, DCI5 may be the last received DCI communication and may not overlap with any other DCI communications. Thus, the UE 120 and/or the network node 110 may apply a TCI update that is based at least in part on TCI5 that is indicated by DCI5. The TCI update may be applied to both the first component carrier and the second component carrier. For example, the one or more rules may indicate for the TCI update to be applied to all component carriers included in the component carrier list.

In some aspects, the one or more rules may indicate to use a component carrier identifier, such as a component carrier identifier associated with receiving the DCI or a component carrier identifier indicated in the DCI, to select the DCI for determining the TCI update, based at least in part on two or more DCI communications overlapping and being the last received DCI communications. In one example, the first component carrier and the second component carrier may be included in the same component carrier list. The last received DCI communications may include DCI3 and DCI5 associated with the first component carrier, and DCI4 associated with the second component carrier. DCI3, DCI4, and DCI5 may be overlapping DCI. In some aspects, the overlap may be an overlap in time, such as a symbol level overlap or a slot level overlap. For example, two DCI communications may not overlap in the same symbol but may overlap in the same slot. In some aspects, the overlap may be a partial overlap. For example, the first component carrier may have a different SCS than the second component carrier, and therefore, the first component carrier may only partially overlap with the second component carrier. The one or more rules may indicate for the UE 120 and/or the network node 110 to determine the TCI update using one of TCI3, TCI4, and TCI5 (corresponding to the last received DCI communications) based at least in part on the component carrier identifier. For example, the one or more rules may indicate for the UE 120 and/or the network node 110 to select the TCI for the TCI update based at least in part on the corresponding DCI having the smallest component carrier identifier of the plurality of DCI communications. In another example, the one or more rules may indicate for the UE 120 and/or the network node 110 to select the TCI for the TCI update based at least in part on the corresponding DCI having the largest component carrier identifier of the plurality of DCI communications.

In some aspects, two or more of the overlapping DCI communications may have the same component carrier identifiers. For example, the smallest component carrier identifier may be the first component carrier identifier, and both DCI3 and DCI5 may be associated with the first component carrier. In this case, the one or more rules may indicate to select the TCI for the TCI update based at least in part on a CORESET identifier associated with the corresponding DCI. For example, DCI3 may be associated with CORESET0 and DCI5 may be associated with CORESET1. Thus, the UE 120 and/or the network node 110 may select TCI3 (corresponding to DCI3) to be applied as the TCI update for the first component carrier and the second component carrier. In some aspects, two or more of the overlapping DCI communications may have the same component carrier identifiers and the same CORESET identifiers. For example, both DCI3 and DCI5 may be associated with the first component carrier and be associated with CORESET0. In this case, the one or more rules may indicate to select the TCI for the TCI update based at least in part on a search space identifier associated with the corresponding DCI. For example, DCI3 may be associated with SS0 and DCI5 may be associated with SS1. Thus, the UE 120 and/or the network node 110 may select TCI3 (corresponding to DCI3) to be applied as the TCI update for the first component carrier and the second component carrier. The rules described herein are provided for example only. For example, the one or more rules may be based at least in part on conditions other than the component carrier identifier, the CORESET identifier, and the search space identifier. Additionally, or alternatively, the one or more rules may indicate to apply the conditions in any order. For example, the one or more rules may indicate to select the TCI based at least in part on the corresponding DCI having the smallest search space identifier, regardless of the component carrier identifier and/or the CORESET identifier.

In some aspects, TCI states for the component carriers in the component carrier list may be determined separately based at least in part on a transmission direction. For example, a first type of TCI may be associated with downlink transmissions and joint transmissions, while a second type of TCI may be associated with uplink transmissions. In some aspects, the UE 120 and/or the network node 110 may apply different TCI updates for downlink/joint transmissions and for uplink transmissions. In one example, DCI1 (indicating UL TCI1) associated with the first component carrier and DCI2 (indicating DL TCI2) associated with the second component carrier may be received at a first time. DCI3 (indicating DL TCI3) associated with the first component carrier and DCI4 (indicating UL TCI4) associated with the second component carrier may be received at a second time. DCI5 (indicating DL TCI5) associated with the first component carrier may be received at a third time. The one or more rules may indicate to select an uplink TCI corresponding to a last received DCI indicating uplink TCI and to select a downlink/joint TCI corresponding to a last received DCI indicating downlink/joint TCI. In this case, the UE 120 and/or the network node 110 may select TCI4 for the uplink TCI and may select TCI5 for the downlink/joint TCI.

In some aspects, when a PDCCH carrying a DCI has repetition, a last symbol in the last repetition may be used to determine the DCI reception time. The CORESET ID and/or the search space ID may be different in the different PDCCH repetitions. In some aspects, a CORESET ID and search space ID may be determined based at least in part on a predefined repetition, such as a last repetition of the PDCCH. In some aspects, when a PUCCH carrying an ACK has repetition, a last portion of the PUCCH repetition may be used to determine the ACK reception time. In some aspects, when the PDCCH carrying the DCI has repetition, a last symbol in the earliest repetition may be used to determine the DCI reception time.

As described above, ACK messages that are based at least in part on DCI communications and are associated with multiple component carriers may be contained in the same PUCCH resource. When the component carriers are not included in a component carrier list, the UE 120 or the network node 110 may use a DCI that is received last in time to determine a TCI update. When multiple DCIs are received in the same symbol of the component carrier, the UE 120 or the network node 110 may use a CORESET ID or a search space ID to determine the TCI update. However, the existing rules may not apply when the component carriers are included in a same component carrier list. Thus, the UE 120 and the network node 110 may not be able to determine which TCI is to be used for the component carriers that are included in the same component carrier list. Using the techniques and apparatuses described herein, the UE 120 and the network node 110 may determine a TCI update to be applied for multiple component carriers that are included in a component carrier list. The TCI update may be based at least in part on a select DCI communication of a plurality of DCI communications and one or more rules, where each of the DCI communications indicate to apply a particular TCI.

As indicated above, FIG. 8 is provided as an example. Other examples may differ from what is described with regard to FIG. 8.

Figure 9:
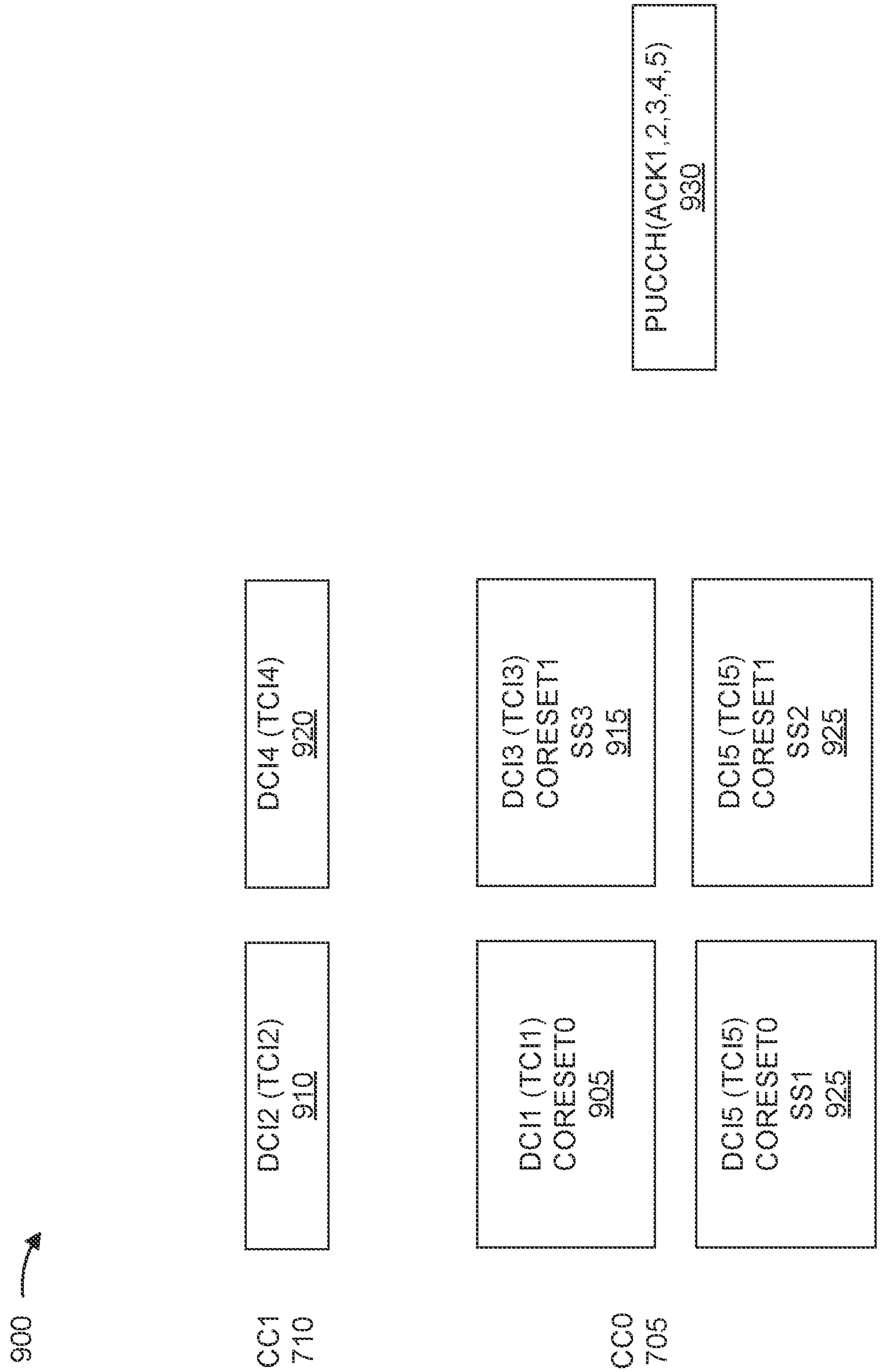
FIG. 9 is a diagram illustrating a first example of TCI selection for a TCI update, in accordance with the present disclosure.

FIG. 9 is a diagram illustrating a first example 900 of TCI selection for a TCI update, in accordance with the present disclosure. The UE 120 may receive a plurality of DCI communications associated with CC0 705 and CC1 710, such as DCI1 905, DCI2 910, DCI3 915, DCI4 920, and DCI5 925. Each of the DCI communications may indicate a TCI state. For example, DCI1 905 may indicate to apply TCI1, DCI2 910 may indicate to apply TCI2, DCI3 915 may indicate to apply TCI3, DCI4 920 may indicate to apply TCI4, and DCI5 925 may indicate to apply TCI5. CC0 705 and CC1 710 may be configured on the same CC list, and TCI updates may be applied for each CC on the CC list. At a first time, the UE 120 may receive DCI1 905 associated with CC0 705, DCI2 910 associated with CC1 710, and a first repetition of DCI5 925 associated with CC0 705. At a second time, the UE 120 may receive DCI3 915 associated with CC0 705, DCI4 920 associated with CC1 710, and a second repetition of DCI5 925 associated with CC0 705. The UE 120 may transmit an ACK message corresponding to one or more of the received DCI communications via PUCCH 930. For example, the UE 120 may transmit ACK1, ACK2, ACK3, ACK4, and ACK5 (shown as ACK1, 2, 3, 4, 5) that respectively correspond to DCI1, DCI2, DCI3, DCI4, and DCI5. The DCI1 905 may be associated with CORESET0. The DCI3 915 may be associated with CORESET1 and SS3. The first repetition of DCI5 925 may be associated with CORESET0 and SS1, and the second repetition of DCI5 925 may be associated with CORESET1 and SS2.

As described herein, the UE 120 and/or the network node 110 may be configured with one or more rules for selecting a TCI state for performing a TCI update for component carriers included in a same component carrier list. The one or more rules may be based at least in part on an order that the DCI communications are received, a PUCCH by which the corresponding ACK messages are transmitted, a component carrier identifier, a CORESET identifier, and/or a search space identifier, among other examples. In this case, DCI1 905, DCI2 910, DCI3 915, DCI4 920, and DCI5 925 are ACKed by the same PUCCH (PUCCH 930). DCI3 915, DCI4 920, and the second repetition of DCI5 925 are received last in time. DCI3 915 and DCI5 925 are received in a component carrier with a smaller component carrier identifier (CC0). DCI3 915 and the second repetition of DCI5 925 have the same CORESET ID (CORESET1). However, the second repetition of DCI5 925 has a smaller SS ID than DCI3 915. For example, DCI5 925 is associated with SS2 while DCI3 915 is associated with SS3. Thus, the TCI5 indicated by DCI5 925 may be used as the TCI for the TCI update for all component carriers in the component carrier list.

As indicated above, FIG. 9 is provided as an example. Other examples may differ from what is described with regard to FIG. 9.

Figure 10:
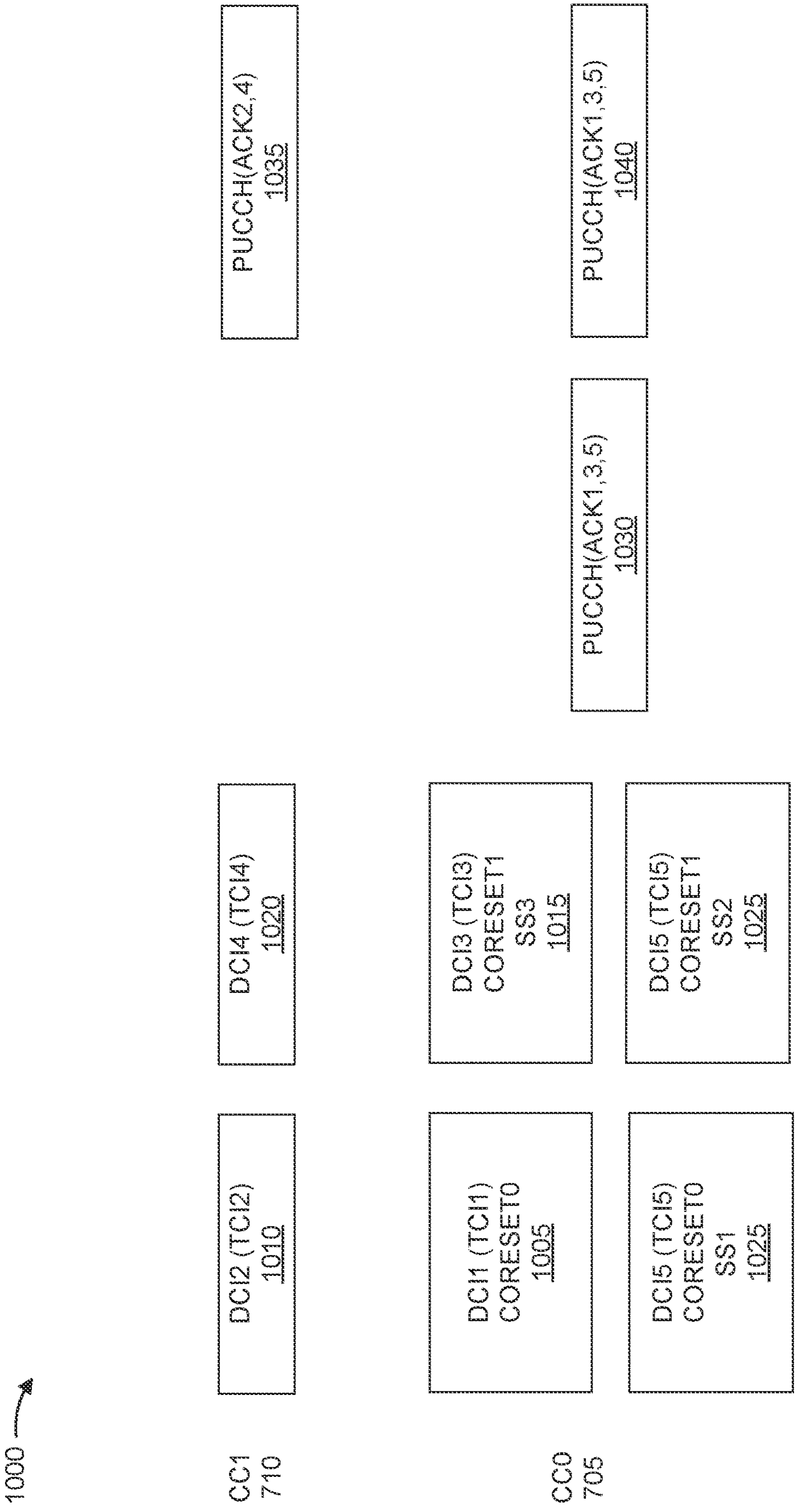
FIG. 10 is a diagram illustrating a second example of TCI selection for a TCI update, in accordance with the present disclosure.

FIG. 10 is a diagram illustrating a second example 1000 of TCI selection for a TCI update, in accordance with the present disclosure. The UE 120 may receive a plurality of DCI communications associated with CC0 705 and CC1 710, such as DCI1 1005, DCI2 1010, DCI3 1015, DCI4 1020, and DCI5 1025. Each of the DCI communications may indicate a TCI state. For example, DCI1 1005 may indicate to apply TCI1, DCI2 1010 may indicate to apply TCI2, DCI3 1015 may indicate to apply TCI3, DCI4 1020 may indicate to apply TCI4, and DCI5 1025 may indicate to apply TCI5. CC0 705 and CC1 710 may be configured on the same CC list, and TCI updates may be applied for each CC on the CC list. At a first time, the UE 120 may receive DCI1 1005 associated with CC0 705, DCI2 1010 associated with CC1 710, and a first repetition of DCI5 1025 associated with CC0 705. At a second time, the UE 120 may receive DCI3 1015 associated with CC0 705, DCI4 1020 associated with CC1 710, and a second repetition of DCI5 1025 associated with CC0 705. The UE 120 may transmit a first ACK message that includes ACK1, ACK3, and ACK5 respectively associated with DCI1 1005, DCI3 1015, and DCI5 1025 at a third time. The UE 120 may transmit the first ACK message via PUCCH 1030. The UE 120 may transmit a second ACK message that includes ACK2 and ACK4 respectively associated with DCI2 1010 and DCI4 1020 at a fourth time. The UE 120 may transmit the second ACK message via PUCCH 1035. The UE 120 may transmit a third ACK message that includes ACK1, ACK3, and ACK5 respectively associated with DCI1 1005, DCI3 1015, and DCI5 1025 at the fourth time. The UE 120 may transmit the third ACK message via PUCCH 1040. The DCI1 905 may be associated with CORESET0. The DCI3 915 may be associated with CORESET1 and SS3. The first repetition of DCI5 925 may be associated with CORESET0 and SS1, and the second repetition of DCI5 925 may be associated with CORESET1 and SS2.

As described herein, the UE 120 and/or the network node 110 may be configured with one or more rules for selecting a TCI state for performing a TCI update for component carriers included in a same component carrier list. The one or more rules may be based at least in part on an order that the DCI communications are received, a PUCCH by which the corresponding ACK messages are transmitted, a component carrier identifier, a CORESET identifier, and/or a search space identifier, among other examples. In this case, latest ACKs corresponding to DCI1 1005, DCI2 1010, DCI3 1015, DCI4 1020, and DCI5 1025 are transmitted by different PUCCHs (e.g., PUCCH 1035 and PUCCH 1040). However, PUCCH 1035 and PUCCH 1040 overlap in time. Thus, the UE 120 and/or the network node 110 may consider the ACKs corresponding to DCI1 1005, DCI2 1010, DCI3 1015, DCI4 1020, and DCI5 1025 to be transmitted at the same time. DCI3 1015, DCI4 1020, and the second repetition of DCI5 1025 are received last in time. DCI3 1015 and DCI5 1025 are received in a component carrier with a smaller component carrier identifier (CC0). DCI3 1015 and the second repetition of DCI5 1025 have the same CORESET ID (CORESET1). However, the second repetition of DCI5 1025 has a smaller SS ID than DCI3 1015. For example, DCI5 1025 is associated with SS2 while DCI3 1015 is associated with SS3. Thus, the TCI5 indicated by DCI5 1025 may be used as the TCI for the TCI update for all component carriers in the component carrier list.

As indicated above, FIG. 10 is provided as an example. Other examples may differ from what is described with regard to FIG. 10.

Figure 11:
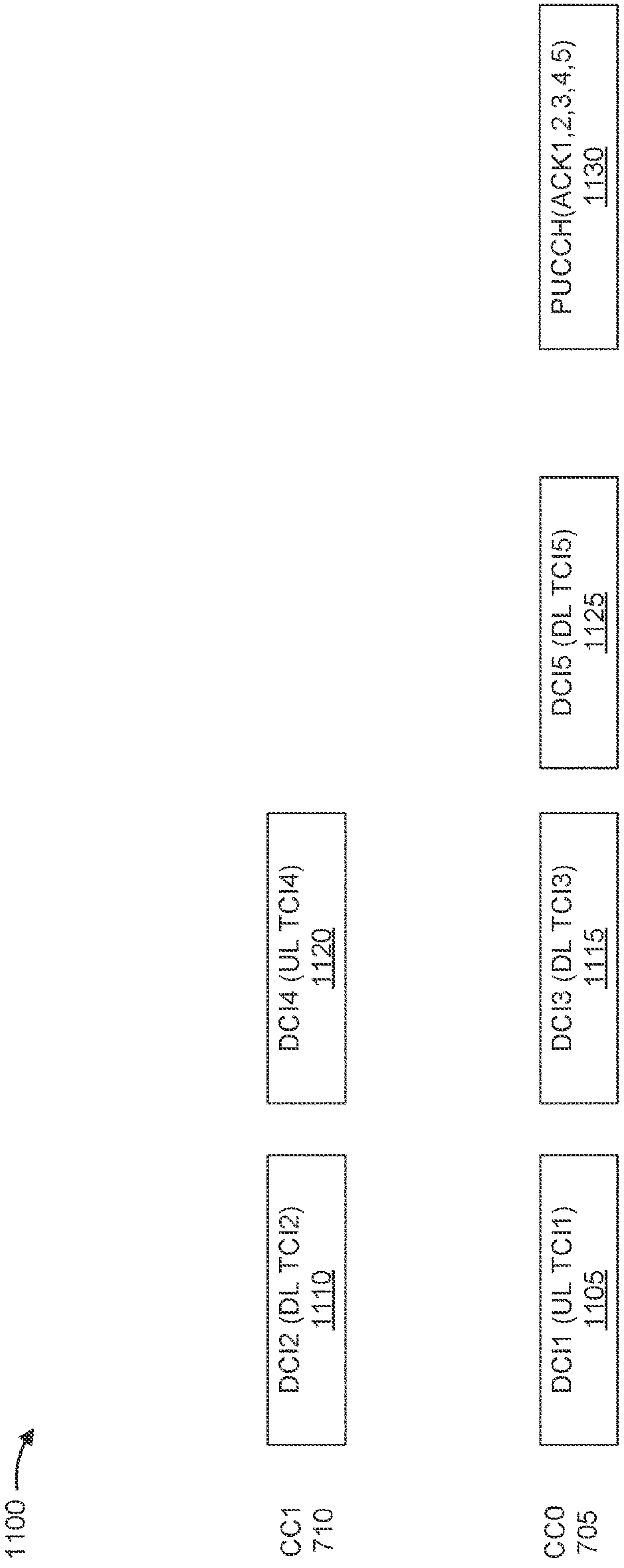
FIG. 11 is a diagram illustrating a third example of TCI selection for a TCI update, in accordance with the present disclosure.

FIG. 11 is a diagram illustrating a third example 1100 of TCI selection for a TCI update, in accordance with the present disclosure. As described herein, TCI states for the component carriers in the component carrier list may be determined separately based at least in part on a transmission direction. For example, a first type of TCI may be associated with downlink transmissions and joint transmissions, while a second type of TCI may be associated with uplink transmissions. CC0 705 and CC1 710 may be configured on the same CC list, and TCI updates may be applied for each CC on the CC list. In some aspects, the UE 120 and/or the network node 110 may apply different TCI updates for downlink/joint transmissions and for uplink transmissions. In one example, DCI1 1105 (indicating UL TCI1) associated with CC0 705 and DCI2 1110 (indicating DL TCI2) associated with the CC1 710 may be received at a first time. DCI3 1115 (indicating DL TCI3) associated with CC0 705 and DCI4 1120 (indicating UL TCI4) associated with CC1 710 may be received at a second time. DCIS 1125 (indicating DL TCI5) associated with CC0 705 may be received at a third time. The one or more rules may indicate to select an uplink TCI corresponding to a last received DCI indicating uplink TCI and to select a downlink/joint TCI corresponding to a last received DCI indicating downlink/joint TCI. In this case, the last received DCI communication indicating uplink TCI is DCI4 1120 and the last received communication indicating downlink/joint TCI is TCI5 1125. Thus, the UE 120 and/or the network node 110 may select TCI4 for the uplink TCI and TCI5 for the downlink/joint TCI.

As indicated above, FIG. 11 is provided as an example. Other examples may differ from what is described with regard to FIG. 11.

Figure 12:
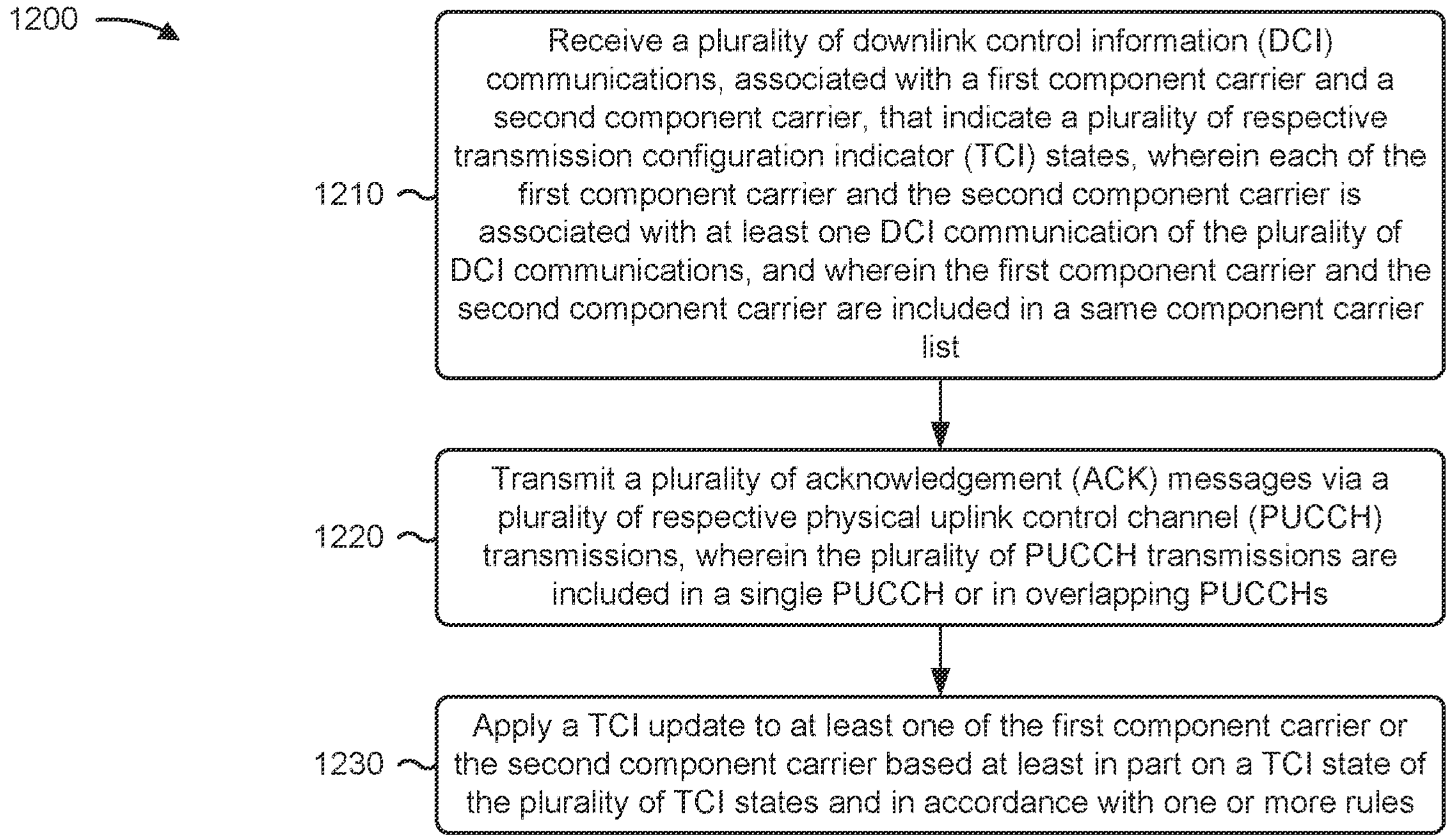
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with updating a TCI for a component carrier list.

As shown in FIG. 12, in some aspects, process 1200 may include receiving a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list (block 1210). For example, the UE (e.g., using communication manager 140 and/or reception component 1402, depicted in FIG. 14) may receive a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list, as described above.

As further shown in FIG. 12, in some aspects, process 1200 may include transmitting a plurality of ACK messages via a plurality of respective PUCCH transmissions, wherein the plurality of PUCCH transmissions are included in a single PUCCH or in overlapping PUCCHs (block 1220). For example, the UE (e.g., using communication manager 140 and/or transmission component 1404, depicted in FIG. 14) may transmit a plurality of ACK messages via a plurality of respective PUCCH transmissions, wherein the plurality of PUCCH transmissions are included in a single PUCCH or in overlapping PUCCHs, as described above.

As further shown in FIG. 12, in some aspects, process 1200 may include applying a TCI update to at least one of the first component carrier or the second component carrier based at least in part on a TCI state of the plurality of TCI states and in accordance with one or more rules (block 1230). For example, the UE (e.g., using communication manager 140 and/or applying component 1408, depicted in FIG. 14) may apply a TCI update to at least one of the first component carrier or the second component carrier based at least in part on a TCI state of the plurality of TCI states and in accordance with one or more rules, as described above.

Process 1200 may include additional aspects, such as any single aspect or any combination of aspects described below and/or in connection with one or more other processes described elsewhere herein.

In a first aspect, process 1200 includes receiving a plurality of other DCI communications, associated with a third component carrier that is not included in a component carrier list, that indicate a plurality of respective other TCI states, transmitting a plurality of other ACK messages via a plurality of respective other PUCCH transmissions that are included in another PUCCH, wherein each ACK message of the plurality of other ACK messages corresponds to a respective DCI communication of the plurality of other DCI communications, and applying a different TCI update to the third component carrier based at least in part on a TCI state of the plurality of other TCI states that corresponds to a last DCI communication of the plurality of other DCI communications.

In a second aspect, alone or in combination with the first aspect, process 1200 includes applying the different TCI update to the third component carrier according to a control resource set identifier or a component carrier identifier based at least in part on two or more DCI communications of the plurality of DCI communications being received in a same symbol in the third component carrier.

In a third aspect, alone or in combination with one or more of the first and second aspects, applying the TCI update to the first component carrier and the second component carrier comprises applying the TCI update to all component carriers in the same component carrier list.

In a fourth aspect, alone or in combination with one or more of the first through third aspects, the plurality of DCI communications includes a select plurality of DCI communications that are associated with a plurality of ACK messages that are transmitted via a last PUCCH transmission of the plurality of PUCCH transmissions.

In a fifth aspect, alone or in combination with one or more of the first through fourth aspects, the TCI state corresponds to a TCI state that is associated with a last DCI communication of the select plurality of DCI communications.

In a sixth aspect, alone or in combination with one or more of the first through fifth aspects, the last PUCCH transmission includes a plurality of ACK messages that are transmitted in a same symbol or a same slot.

In a seventh aspect, alone or in combination with one or more of the first through sixth aspects, the plurality of DCI communications includes a first DCI communication and a second DCI communication that overlap in time and are associated with a plurality of ACK messages that are transmitted via a last PUCCH transmission of the plurality of PUCCH transmissions.

In an eighth aspect, alone or in combination with one or more of the first through seventh aspects, the TCI state is based at least in part on a component carrier identifier associated with receiving the first DCI communication or the second DCI communication or is based at least in part on a component carrier identifier that is included in the first DCI communication or the second DCI communication.

In a ninth aspect, alone or in combination with one or more of the first through eighth aspects, an overlap associated with the overlap in time is a symbol-level overlap or a slot-level overlap.

In a tenth aspect, alone or in combination with one or more of the first through ninth aspects, an overlap associated with the overlap in time is a partial overlap in time.

In an eleventh aspect, alone or in combination with one or more of the first through tenth aspects, the one or more rules indicate to apply the TCI state to the first component carrier and the second component carrier according to a component carrier identifier priority.

In a twelfth aspect, alone or in combination with one or more of the first through eleventh aspects, the one or more rules further indicate to apply the TCI state to the first component carrier and the second component carrier according to a control resource set priority based at least in part on the first component carrier and the second component carrier having a same component carrier identifier priority.

In a thirteenth aspect, alone or in combination with one or more of the first through twelfth aspects, the one or more rules further indicate to apply the TCI state to the first component carrier and the second component carrier according to a search space priority based at least in part on the first component carrier and the second component carrier having a same component carrier identifier priority and a same control resource set priority.

In a fourteenth aspect, alone or in combination with one or more of the first through thirteenth aspects, applying the TCI state to the first component carrier and the second component carrier comprises applying a first TCI state for downlink TCI or joint TCI and applying a second TCI state for uplink TCI.

In a fifteenth aspect, alone or in combination with one or more of the first through fourteenth aspects, process 1200 includes determining timing information, component carrier priority information, control resource set priority information, or search space priority information for DCI reception according to a last symbol in a last repetition of a repeating physical downlink control channel.

In a sixteenth aspect, alone or in combination with one or more of the first through fifteenth aspects, process 1200 includes determining timing information, component carrier priority information, control resource set priority information, or search space priority information for ACK message transmission according to a last portion of a repeating PUCCH.

In a seventeenth aspect, alone or in combination with one or more of the first through sixteenth aspects, process 1200 includes determining timing information, component carrier priority information, control resource set priority information, or search space priority information for DCI reception according to a last symbol in a first repetition of a repeating physical downlink control channel.

In an eighteenth aspect, alone or in combination with one or more of the first through seventeenth aspects, process 1200 includes initiating a timer based at least in part on receiving DCI associated with the first component carrier or the second component carrier, and applying the TCI update based at least in part on an expiration of the timer.

In a nineteenth aspect, alone or in combination with one or more of the first through eighteenth aspects, receiving the plurality of DCI communications associated with the first component carrier and the second component carrier comprises receiving first DCI associated with the first component carrier that indicates to apply a first TCI state, receiving second DCI associated with the first component carrier that indicates to apply a second TCI state, receiving third DCI associated with the second component carrier that indicates to apply a third TCI state, and receiving fourth DCI associated with the second component carrier that indicates to apply a fourth TCI state.

In a twentieth aspect, alone or in combination with one or more of the first through nineteenth aspects, transmitting the plurality of ACK messages via the plurality of respective PUCCH transmissions comprises transmitting a first ACK message corresponding to the first DCI via a first PUCCH transmission, transmitting a second ACK message corresponding to the second DCI via a second PUCCH transmission, transmitting a third ACK message corresponding to the third DCI via a third PUCCH transmission, and transmitting a fourth ACK message corresponding to the fourth DCI via a fourth PUCCH transmission, wherein the first PUCCH transmission, the second PUCCH transmission, the third PUCCH transmission, and the fourth PUCCH transmission are included in the single PUCCH or in overlapping PUCCHs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
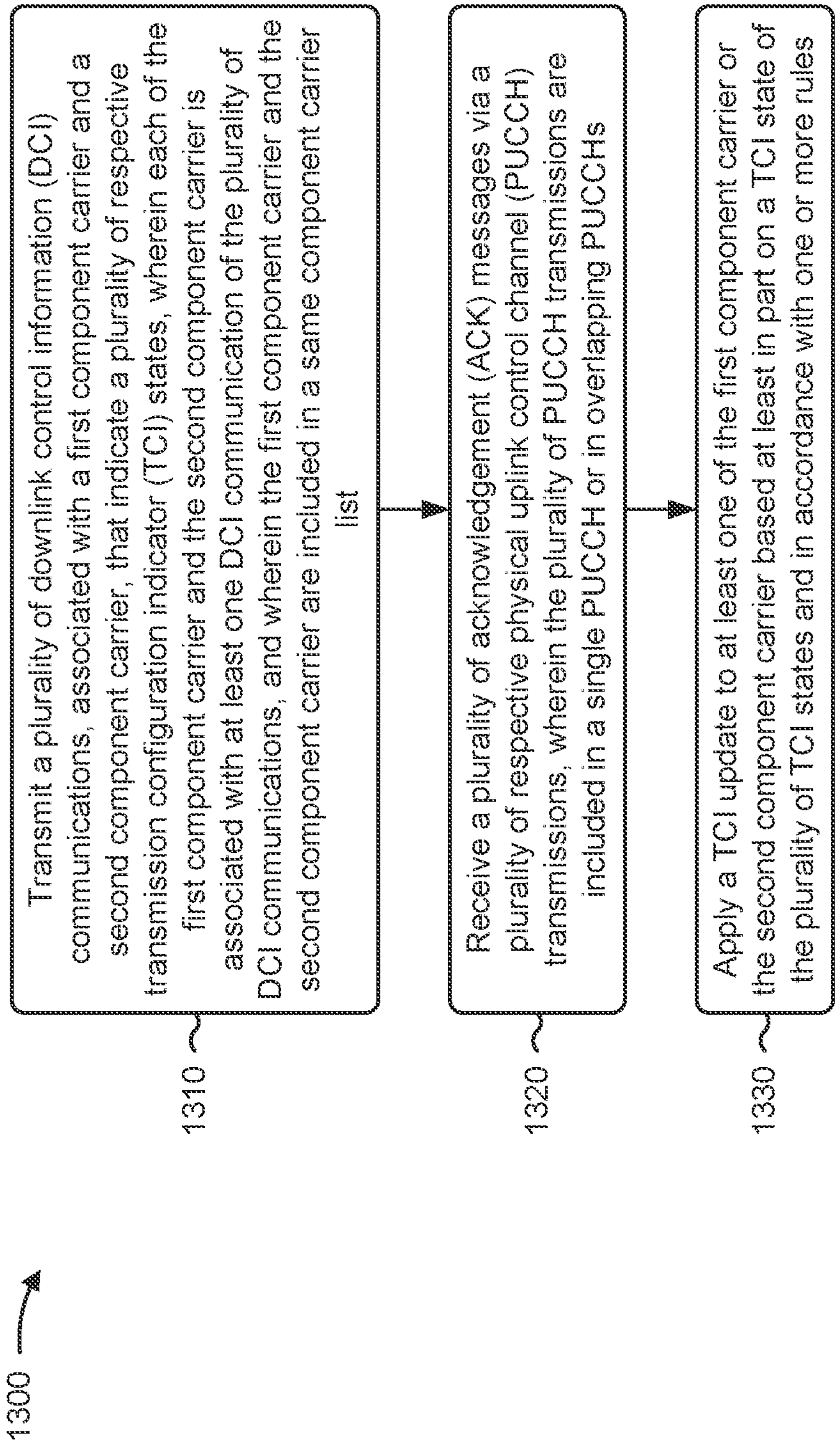
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with updating a TCI for a component carrier list.

As shown in FIG. 13, in some aspects, process 1300 may include transmitting a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list (block 1310). For example, the network node (e.g., using communication manager 150 and/or transmission component 1504, depicted in FIG. 15) may transmit a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list, as described above.

As further shown in FIG. 13, in some aspects, process 1300 may include receiving a plurality of ACK messages via a plurality of respective PUCCH transmissions, wherein the plurality of PUCCH transmissions are included in a single PUCCH or in overlapping PUCCHs (block 1320). For example, the network node (e.g., using communication manager 150 and/or reception component 1502, depicted in FIG. 15) may receive a plurality of ACK messages via a plurality of respective PUCCH transmissions, wherein the plurality of PUCCH transmissions are included in a single PUCCH or in overlapping PUCCHs, as described above.

As further shown in FIG. 13, in some aspects, process 1300 may include applying a TCI update to at least one of the first component carrier or the second component carrier based at least in part on a TCI state of the plurality of TCI states and in accordance with one or more rules (block 1330). For example, the network node (e.g., using communication manager 150 and/or applying component 1508, depicted in FIG. 15) may apply a TCI update to at least one of the first component carrier or the second component carrier based at least in part on a TCI state of the plurality of TCI states and in accordance with one or more rules, as described above.

Process 1300 may include additional aspects, such as any single aspect or any combination of aspects described below and/or in connection with one or more other processes described elsewhere herein.

In a first aspect, process 1300 includes transmitting a plurality of other DCI communications, associated with a third component carrier that is not included in a component carrier list, that indicate a plurality of respective other TCI states, receiving a plurality of other ACK messages via a plurality of respective other PUCCH transmissions that are included in another PUCCH, wherein each ACK message of the plurality of other ACK messages corresponds to a respective DCI communication of the plurality of other DCI communications, and applying a different TCI update to the third component carrier based at least in part on a TCI state of the plurality of other TCI states that corresponds to a last DCI communication of the plurality of other DCI communications.

In a second aspect, alone or in combination with the first aspect, process 1300 includes applying the different TCI update to the third component carrier according to a control resource set identifier or a component carrier identifier based at least in part on two or more DCI communications of the plurality of DCI communications being transmitted in a same symbol in the third component carrier.

In a third aspect, alone or in combination with one or more of the first and second aspects, applying the TCI update to the first component carrier and the second component carrier comprises applying the TCI update to all component carriers in the same component carrier list.

In a fourth aspect, alone or in combination with one or more of the first through third aspects, the plurality of DCI communications includes a select plurality of DCI communications that are associated with a plurality of ACK messages that are received via a last PUCCH transmission of the plurality of PUCCH transmissions.

In a fifth aspect, alone or in combination with one or more of the first through fourth aspects, the TCI state corresponds to a TCI state that is associated with a last DCI communication of the select plurality of DCI communications.

In a sixth aspect, alone or in combination with one or more of the first through fifth aspects, the last PUCCH transmission includes a plurality of ACK messages that are transmitted in a same symbol or a same slot.

In a seventh aspect, alone or in combination with one or more of the first through sixth aspects, the plurality of DCI communications includes a first DCI communication and a second DCI communication that overlap in time and are associated with a plurality of ACK messages that are received via a last PUCCH transmission of the plurality of PUCCH transmissions.

In an eighth aspect, alone or in combination with one or more of the first through seventh aspects, the TCI state is based at least in part on a component carrier identifier associated with transmitting the first DCI communication or the second DCI communication or is based at least in part on a component carrier identifier that is included in the first DCI communication or the second DCI communication.

In a ninth aspect, alone or in combination with one or more of the first through eighth aspects, an overlap associated with the overlap in time is a symbol-level overlap or a slot-level overlap.

In a tenth aspect, alone or in combination with one or more of the first through ninth aspects, an overlap associated with the overlap in time is a partial overlap in time.

In an eleventh aspect, alone or in combination with one or more of the first through tenth aspects, the one or more rules indicate to apply the TCI state to the first component carrier and the second component carrier according to a component carrier identifier priority.

In a twelfth aspect, alone or in combination with one or more of the first through eleventh aspects, the one or more rules further indicate to apply the TCI state to the first component carrier and the second component carrier according to a control resource set priority based at least in part on the first component carrier and the second component carrier having a same component carrier identifier priority.

In a thirteenth aspect, alone or in combination with one or more of the first through twelfth aspects, the one or more rules further indicate to apply the TCI state to the first component carrier and the second component carrier according to a search space priority based at least in part on the first component carrier and the second component carrier having a same component carrier identifier priority and a same control resource set priority.

In a fourteenth aspect, alone or in combination with one or more of the first through thirteenth aspects, applying the TCI state to the first component carrier and the second component carrier comprises applying a first TCI state for downlink TCI or joint TCI and applying a second TCI state for uplink TCI.

In a fifteenth aspect, alone or in combination with one or more of the first through fourteenth aspects, process 1300 includes determining timing information, component carrier priority information, control resource set priority information, or search space priority information for DCI transmission according to a last symbol in a last repetition of a repeating physical downlink control channel.

In a sixteenth aspect, alone or in combination with one or more of the first through fifteenth aspects, process 1300 includes determining timing information, component carrier priority information, control resource set priority information, or search space priority information for ACK message reception according to a last portion of a repeating PUCCH.

In a seventeenth aspect, alone or in combination with one or more of the first through sixteenth aspects, process 1300 includes determining timing information, component carrier priority information, control resource set priority information, or search space priority information for DCI transmission according to a last symbol in a first repetition of a repeating physical downlink control channel.

In an eighteenth aspect, alone or in combination with one or more of the first through seventeenth aspects, transmitting the plurality of DCI communications associated with the first component carrier and the second component carrier comprises transmitting first DCI associated with the first component carrier that indicates to apply a first TCI state, transmitting second DCI associated with the first component carrier that indicates to apply a second TCI state, transmitting third DCI associated with the second component carrier that indicates to apply a third TCI state, and transmitting fourth DCI associated with the second component carrier that indicates to apply a fourth TCI state.

In a nineteenth aspect, alone or in combination with one or more of the first through eighteenth aspects, receiving the plurality of ACK messages via the plurality of respective PUCCH transmissions comprises receiving a first ACK message corresponding to the first DCI via a first PUCCH transmission, receiving a second ACK message corresponding to the second DCI via a second PUCCH transmission, receiving a third ACK message corresponding to the third DCI via a third PUCCH transmission, and receiving a fourth ACK message corresponding to the fourth DCI via a fourth PUCCH transmission.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
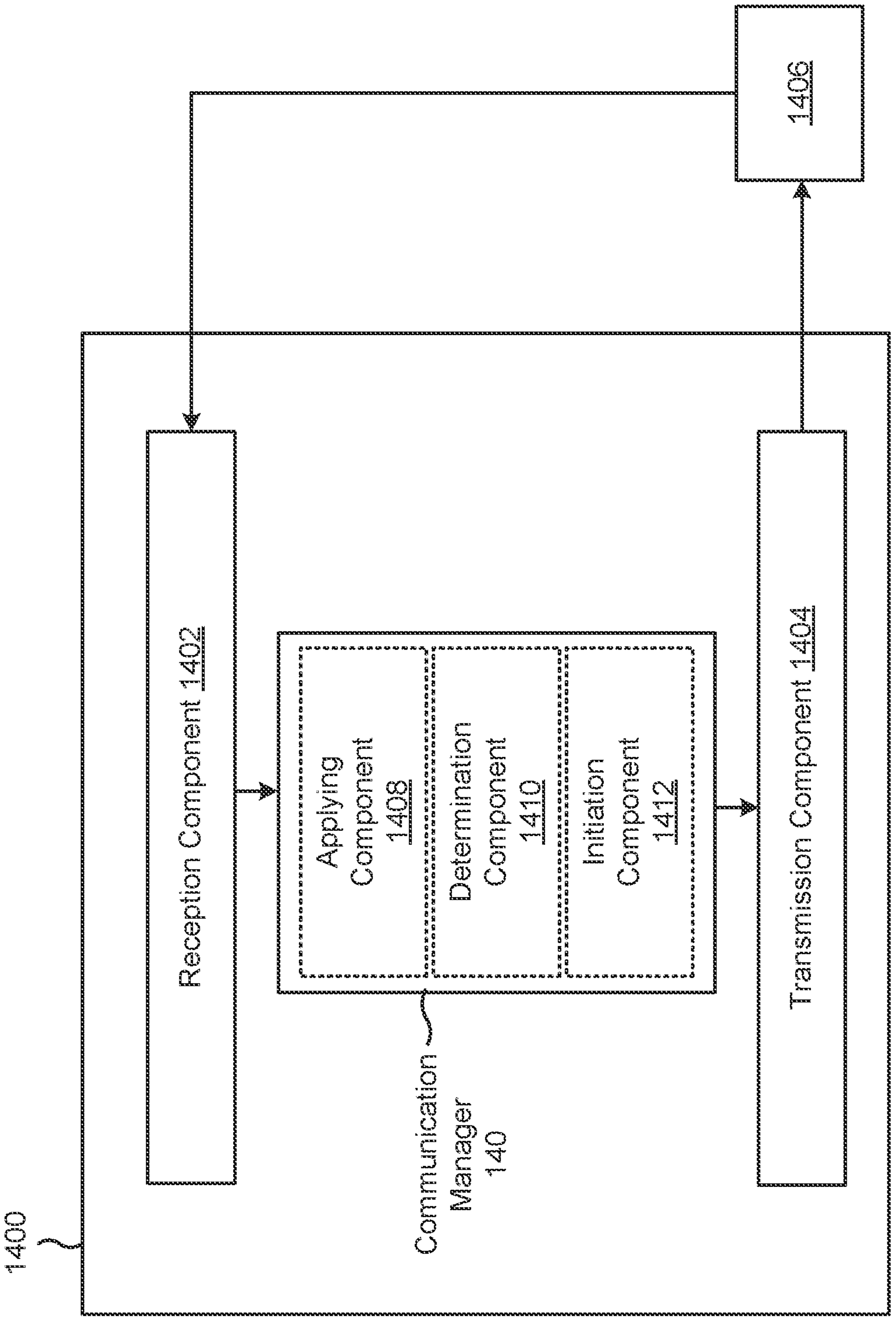
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include one or more of an applying component 1408, a determination component 1410, or an initiation component 1412, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The transmission component 1404 may transmit a plurality of ACK messages via a plurality of respective PUCCH transmissions, wherein the plurality of PUCCH transmissions are included in a single PUCCH or in overlapping PUCCHs. The applying component 1408 may apply a TCI update to at least one of the first component carrier or the second component carrier based at least in part on a TCI state of the plurality of TCI states and in accordance with one or more rules.

The reception component 1402 may receive a plurality of other DCI communications, associated with a third component carrier that is not included in a component carrier list, that indicate a plurality of respective other TCI states. The transmission component 1404 may transmit a plurality of other ACK messages via a plurality of respective other PUCCH transmissions that are included in another PUCCH, wherein each ACK message of the plurality of other ACK messages corresponds to a respective DCI communication of the plurality of other DCI communications. The applying component 1408 may apply a different TCI update to the third component carrier based at least in part on a TCI state of the plurality of other TCI states that corresponds to a last DCI communication of the plurality of other DCI communications. The applying component 1408 may apply the different TCI update to the third component carrier according to a control resource set identifier or a component carrier identifier based at least in part on two or more DCI communications of the plurality of DCI communications being received in a same symbol in the third component carrier.

The determination component 1410 may determine timing information, component carrier priority information, control resource set priority information, or search space priority information for DCI reception according to a last symbol in a last repetition of a repeating physical downlink control channel. The determination component 1410 may determine timing information, component carrier priority information, control resource set priority information, or search space priority information for ACK message transmission according to a last portion of a repeating PUCCH. The determination component 1410 may determine timing information, component carrier priority information, control resource set priority information, or search space priority information for DCI reception according to a last symbol in a first repetition of a repeating physical downlink control channel. The initiation component 1412 may initiate a timer based at least in part on receiving DCI associated with the first component carrier or the second component carrier, and applying the TCI update based at least in part on an expiration of the timer.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
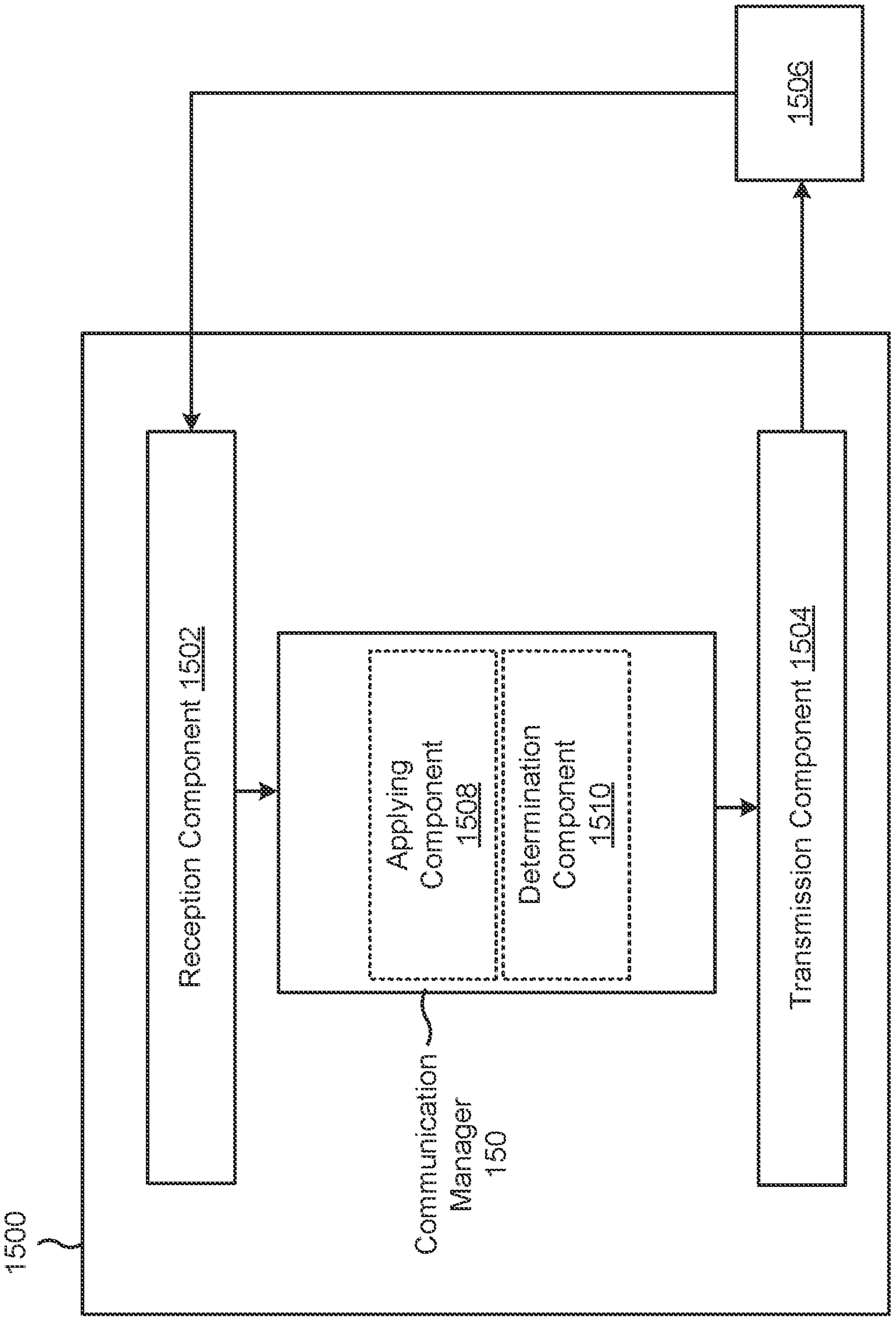
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include one or more of an applying component 1508 or a determination component 1510, among other examples.

In some aspects, the apparatus 1500 may be configured to perform one or more operations described herein in connection with FIGS. 8-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The transmission component 1504 may transmit a plurality of DCI communications, associated with a first component carrier and a second component carrier, that indicate a plurality of respective TCI states, wherein each of the first component carrier and the second component carrier is associated with at least one DCI communication of the plurality of DCI communications, and wherein the first component carrier and the second component carrier are included in a same component carrier list. The reception component 1502 may receive a plurality of ACK messages via a plurality of respective PUCCH transmissions, wherein the plurality of PUCCH transmissions are included in a single PUCCH or in overlapping PUCCHs. The applying component 1508 may apply a TCI update to at least one of the first component carrier or the second component carrier based at least in part on a TCI state of the plurality of TCI states and in accordance with one or more rules.

The transmission component 1504 may transmit a plurality of other DCI communications, associated with a third component carrier that is not included in a component carrier list, that indicate a plurality of respective other TCI states. The reception component 1502 may receive a plurality of other ACK messages via a plurality of respective other PUCCH transmissions that are included in another PUCCH, wherein each ACK message of the plurality of other ACK messages corresponds to a respective DCI communication of the plurality of other DCI communications. The applying component 1508 may apply a different TCI update to the third component carrier based at least in part on a TCI state of the plurality of other TCI states that corresponds to a last DCI communication of the plurality of other DCI communications. The applying component 1508 may apply the different TCI update to the third component carrier according to a control resource set identifier or a component carrier identifier based at least in part on two or more DCI communications of the plurality of DCI communications being transmitted in a same symbol in the third component carrier.

The determination component 1510 may determine timing information, component carrier priority information, control resource set priority information, or search space priority information for DCI transmission according to a last symbol in a last repetition of a repeating physical downlink control channel. The determination component 1510 may determine timing information, component carrier priority information, control resource set priority information, or search space priority information for ACK message reception according to a last portion of a repeating PUCCH. The determination component 1510 may determine timing information, component carrier priority information, control resource set priority information, or search space priority information for DCI transmission according to a last symbol in a first repetition of a repeating physical downlink control channel.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a plurality of downlink control information (DCI) communications, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list; transmitting a plurality of acknowledgement (ACK) messages via a plurality of respective physical uplink control channel (PUCCH) transmissions, wherein the plurality of PUCCH transmissions are included in a single PUCCH or in overlapping PUCCHs; and applying a TCI update to at least one of the first component carrier or the second component carrier based at least in part on a TCI state of the plurality of TCI states and in accordance with one or more rules.

Aspect 2: The method of Aspect 1, further comprising: receiving a plurality of other DCI communications, associated with a third component carrier that is not included in a component carrier list, that indicate a plurality of respective other TCI states; transmitting a plurality of other ACK messages via a plurality of respective other PUCCH transmissions that are included in another PUCCH, wherein each ACK message of the plurality of other ACK messages corresponds to a respective DCI communication of the plurality of other DCI communications; and applying a different TCI update to the third component carrier based at least in part on a TCI state of the plurality of other TCI states that corresponds to a last DCI communication of the plurality of other DCI communications.

Aspect 3: The method of Aspect 2, further comprising applying the different TCI update to the third component carrier according to a control resource set identifier or a component carrier identifier based at least in part on two or more DCI communications of the plurality of DCI communications being received in a same symbol in the third component carrier.

Aspect 4: The method of any of Aspects 1-3, wherein applying the TCI update to the first component carrier and the second component carrier comprises applying the TCI update to all component carriers in the same component carrier list.

Aspect 5: The method of any of Aspects 1-4, wherein the plurality of DCI communications includes a select plurality of DCI communications that are associated with a plurality of ACK messages that are transmitted via a last PUCCH transmission of the plurality of PUCCH transmissions.

Aspect 6: The method of Aspect 5, wherein the TCI state corresponds to a TCI state that is associated with a last DCI communication of the select plurality of DCI communications.

Aspect 7: The method of Aspect 6, wherein the last PUCCH transmission includes a plurality of ACK messages that are transmitted in a same symbol or a same slot.

Aspect 8: The method of any of Aspects 1-7, wherein the plurality of DCI communications includes a first DCI communication and a second DCI communication that overlap in time and are associated with a plurality of ACK messages that are transmitted via a last PUCCH transmission of the plurality of PUCCH transmissions.

Aspect 9: The method of Aspect 8, wherein the TCI state is based at least in part on a component carrier identifier associated with receiving the first DCI communication or the second DCI communication or is based at least in part on a component carrier identifier that is included in the first DCI communication or the second DCI communication.

Aspect 10: The method of Aspect 8, wherein an overlap associated with the overlap in time is a symbol-level overlap or a slot-level overlap.

Aspect 11: The method of Aspect 8, wherein an overlap associated with the overlap in time is a partial overlap in time.

Aspect 12: The method of Aspect 8, wherein the one or more rules indicate to apply the TCI state to the first component carrier and the second component carrier according to a component carrier identifier priority.

Aspect 13: The method of Aspect 12, wherein the one or more rules further indicate to apply the TCI state to the first component carrier and the second component carrier according to a control resource set priority based at least in part on the first component carrier and the second component carrier having a same component carrier identifier priority.

Aspect 14: The method of Aspect 13, wherein the one or more rules further indicate to apply the TCI state to the first component carrier and the second component carrier according to a search space priority based at least in part on the first component carrier and the second component carrier having a same component carrier identifier priority and a same control resource set priority.

Aspect 15: The method of any of Aspects 1-14, wherein applying the TCI state to the first component carrier and the second component carrier comprises applying a first TCI state for downlink TCI or joint TCI and applying a second TCI state for uplink TCI.

Aspect 16: The method of Aspect 15, further comprising determining timing information, component carrier priority information, control resource set priority information, or search space priority information for DCI reception according to a last symbol in a last repetition of a repeating physical downlink control channel.

Aspect 17: The method of Aspect 15, further comprising determining timing information, component carrier priority information, control resource set priority information, or search space priority information for ACK message transmission according to a last portion of a repeating PUCCH.

Aspect 18: The method of Aspect 15, further comprising determining timing information, component carrier priority information, control resource set priority information, or search space priority information for DCI reception according to a last symbol in a first repetition of a repeating physical downlink control channel.

Aspect 19: The method of any of Aspects 1-18, further comprising initiating a timer based at least in part on receiving DCI associated with the first component carrier or the second component carrier, and applying the TCI update based at least in part on an expiration of the timer.

Aspect 20: The method of any of Aspects 1-19, wherein receiving the plurality of DCI communications associated with the first component carrier and the second component carrier comprises receiving first DCI associated with the first component carrier that indicates to apply a first TCI state, receiving second DCI associated with the first component carrier that indicates to apply a second TCI state, receiving third DCI associated with the second component carrier that indicates to apply a third TCI state, and receiving fourth DCI associated with the second component carrier that indicates to apply a fourth TCI state.

Aspect 21: The method of Aspect 20, wherein transmitting the plurality of ACK messages via the plurality of respective PUCCH transmissions comprises transmitting a first ACK message corresponding to the first DCI via a first PUCCH transmission, transmitting a second ACK message corresponding to the second DCI via a second PUCCH transmission, transmitting a third ACK message corresponding to the third DCI via a third PUCCH transmission, and transmitting a fourth ACK message corresponding to the fourth DCI via a fourth PUCCH transmission, wherein the first PUCCH transmission, the second PUCCH transmission, the third PUCCH transmission, and the fourth PUCCH transmission are included in the single PUCCH or in overlapping PUCCHs.

Aspect 22: A method of wireless communication performed by a network node, comprising: transmitting a plurality of downlink control information (DCI) communications, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list; receiving a plurality of acknowledgement (ACK) messages via a plurality of respective physical uplink control channel (PUCCH) transmissions, wherein the plurality of PUCCH transmissions are included in a single PUCCH or in overlapping PUCCHs; and applying a TCI update to at least one of the first component carrier or the second component carrier based at least in part on a TCI state of the plurality of TCI states and in accordance with one or more rules.

Aspect 23: The method of Aspect 22, further comprising: transmitting a plurality of other DCI communications, associated with a third component carrier that is not included in a component carrier list, that indicate a plurality of respective other TCI states; receiving a plurality of other ACK messages via a plurality of respective other PUCCH transmissions that are included in another PUCCH, wherein each ACK message of the plurality of other ACK messages corresponds to a respective DCI communication of the plurality of other DCI communications; and applying a different TCI update to the third component carrier based at least in part on a TCI state of the plurality of other TCI states that corresponds to a last DCI communication of the plurality of other DCI communications.

Aspect 24: The method of Aspect 23, further comprising applying the different TCI update to the third component carrier according to a control resource set identifier or a component carrier identifier based at least in part on two or more DCI communications of the plurality of DCI communications being transmitted in a same symbol in the third component carrier.

Aspect 25: The method of any of Aspects 22-24, wherein applying the TCI update to the first component carrier and the second component carrier comprises applying the TCI update to all component carriers in the same component carrier list.

Aspect 26: The method of any of Aspects 22-25, wherein the plurality of DCI communications includes a select plurality of DCI communications that are associated with a plurality of ACK messages that are received via a last PUCCH transmission of the plurality of PUCCH transmissions.

Aspect 27: The method of Aspect 26, wherein the TCI state corresponds to a TCI state that is associated with a last DCI communication of the select plurality of DCI communications.

Aspect 28: The method of Aspect 27, wherein the last PUCCH transmission includes a plurality of ACK messages that are transmitted in a same symbol or a same slot.

Aspect 29: The method of any of Aspects 22-28, wherein the plurality of DCI communications includes a first DCI communication and a second DCI communication that overlap in time and are associated with a plurality of ACK messages that are received via a last PUCCH transmission of the plurality of PUCCH transmissions.

Aspect 30: The method of Aspect 29, wherein the TCI state is based at least in part on a component carrier identifier associated with transmitting the first DCI communication or the second DCI communication or is based at least in part on a component carrier identifier that is included in the first DCI communication or the second DCI communication.

Aspect 31: The method of Aspect 30, wherein an overlap associated with the overlap in time is a symbol-level overlap or a slot-level overlap.

Aspect 32: The method of Aspect 30, wherein an overlap associated with the overlap in time is a partial overlap in time.

Aspect 33: The method of Aspect 30, wherein the one or more rules indicate to apply the TCI state to the first component carrier and the second component carrier according to a component carrier identifier priority.

Aspect 34: The method of Aspect 33, wherein the one or more rules further indicate to apply the TCI state to the first component carrier and the second component carrier according to a control resource set priority based at least in part on the first component carrier and the second component carrier having a same component carrier identifier priority.

Aspect 35: The method of Aspect 34, wherein the one or more rules further indicate to apply the TCI state to the first component carrier and the second component carrier according to a search space priority based at least in part on the first component carrier and the second component carrier having a same component carrier identifier priority and a same control resource set priority.

Aspect 36: The method of any of Aspects 22-35, wherein applying the TCI state to the first component carrier and the second component carrier comprises applying a first TCI state for downlink TCI or joint TCI and applying a second TCI state for uplink TCI.

Aspect 37: The method of Aspect 36, further comprising determining timing information, component carrier priority information, control resource set priority information, or search space priority information for DCI transmission according to a last symbol in a last repetition of a repeating physical downlink control channel.

Aspect 38: The method of Aspect 37, further comprising determining timing information, component carrier priority information, control resource set priority information, or search space priority information for ACK message reception according to a last portion of a repeating PUCCH.

Aspect 39: The method of Aspect 37, further comprising determining timing information, component carrier priority information, control resource set priority information, or search space priority information for DCI transmission according to a last symbol in a first repetition of a repeating physical downlink control channel.

Aspect 40: The method of any of Aspects 22-39, wherein transmitting the plurality of DCI communications associated with the first component carrier and the second component carrier comprises transmitting first DCI associated with the first component carrier that indicates to apply a first TCI state, transmitting second DCI associated with the first component carrier that indicates to apply a second TCI state, transmitting third DCI associated with the second component carrier that indicates to apply a third TCI state, and transmitting fourth DCI associated with the second component carrier that indicates to apply a fourth TCI state.

Aspect 41: The method of Aspect 40, wherein receiving the plurality of ACK messages via the plurality of respective PUCCH transmissions comprises receiving a first ACK message corresponding to the first DCI via a first PUCCH transmission, receiving a second ACK message corresponding to the second DCI via a second PUCCH transmission, receiving a third ACK message corresponding to the third DCI via a third PUCCH transmission, and receiving a fourth ACK message corresponding to the fourth DCI via a fourth PUCCH transmission.

Aspect 42: An apparatus for wireless communication at a device, comprising a processor; memory coupled with the processor; and instructions stored in the memory and executable by the processor to cause the apparatus to perform the method of one or more of Aspects 1-21.

Aspect 43: A device for wireless communication, comprising a memory and one or more processors coupled to the memory, the one or more processors configured to perform the method of one or more of Aspects 1-21.

Aspect 44: An apparatus for wireless communication, comprising at least one means for performing the method of one or more of Aspects 1-21.

Aspect 45: A non-transitory computer-readable medium storing code for wireless communication, the code comprising instructions executable by a processor to perform the method of one or more of Aspects 1-21.

Aspect 46: A non-transitory computer-readable medium storing a set of instructions for wireless communication, the set of instructions comprising one or more instructions that, when executed by one or more processors of a device, cause the device to perform the method of one or more of Aspects 1-21.

Aspect 47: An apparatus for wireless communication at a device, comprising a processor; memory coupled with the processor; and instructions stored in the memory and executable by the processor to cause the apparatus to perform the method of one or more of Aspects 22-41.

Aspect 48: A device for wireless communication, comprising a memory and one or more processors coupled to the memory, the one or more processors configured to perform the method of one or more of Aspects 22-41.

Aspect 49: An apparatus for wireless communication, comprising at least one means for performing the method of one or more of Aspects 22-41.

Aspect 50: A non-transitory computer-readable medium storing code for wireless communication, the code comprising instructions executable by a processor to perform the method of one or more of Aspects 22-41.

Aspect 51: A non-transitory computer-readable medium storing a set of instructions for wireless communication, the set of instructions comprising one or more instructions that, when executed by one or more processors of a device, cause the device to perform the method of one or more of Aspects 22-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to cause the UE to:

receive a plurality of downlink control information (DCI) communications overlapping in time, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list for common TCI updates;

transmit a plurality of acknowledgement (ACK) messages via a plurality of respective physical uplink control channel (PUCCH) transmissions, wherein the plurality of PUCCH transmissions are included in a single PUCCH or in overlapping PUCCHs; and apply a TCI update to at least one of the first component carrier or the second component carrier based at least in part on a TCI state of the plurality of TCI states, and in accordance with one or more rules, wherein the TCI state of the plurality of TCI states is determined based at least in part on a component carrier identifier associated with the at least one DCI communication of the plurality of DCI communications or based at least in part on a component carrier identifier that is included in the at least one DCI communication of the plurality of DCI communications.

2. The UE of claim 1, wherein the one or more processors are further configured to cause the UE to:

receive a plurality of other DCI communications, associated with a third component carrier that is not included in a component carrier list, that indicate a plurality of respective other TCI states;

transmit a plurality of other ACK messages via a plurality of respective other PUCCH transmissions that are included in another PUCCH, wherein each ACK message of the plurality of other ACK messages corresponds to a respective DCI communication of the plurality of other DCI communications; and apply a different TCI update to the third component carrier based at least in part on a TCI state of the plurality of other TCI states that corresponds to a last DCI communication of the plurality of other DCI communications.

3. The UE of claim 2, wherein the one or more processors are further configured to cause the UE to:

apply the different TCI update to the third component carrier according to a control resource set identifier or a component carrier identifier based at least in part on two or more DCI communications of the plurality of DCI communications being received in a same symbol in the third component carrier.

4. The UE of claim 1, wherein the one or more processors, to apply the TCI update to the first component carrier and the second component carrier, are configured to cause the UE to:

apply the TCI update to all component carriers in the same component carrier list.

5. The UE of claim 1, wherein the plurality of DCI communications includes a select plurality of DCI communications that are associated with a plurality of ACK messages that are transmitted via a last PUCCH transmission of the plurality of PUCCH transmissions.

6. The UE of claim 5, wherein the TCI state corresponds to a TCI state that is associated with a last DCI communication of the select plurality of DCI communications.

7. The UE of claim 6, wherein the last PUCCH transmission includes a plurality of ACK messages that are transmitted in a same symbol or a same slot.

8. The UE of claim 1, wherein the plurality of DCI communications includes a first DCI communication and a second DCI communication that overlap in time and are associated with a plurality of ACK messages that are transmitted via a last PUCCH transmission of the plurality of PUCCH transmissions.

9. The UE of claim 8, wherein an overlap associated with the overlap in time is a symbol-level overlap or a slot-level overlap.

10. The UE of claim 8, wherein an overlap associated with the overlap in time is a partial overlap in time.

11. The UE of claim 8, wherein the one or more rules indicate to apply the TCI state to the first component carrier and the second component carrier according to a component carrier identifier priority.

12. The UE of claim 11, wherein the one or more rules further indicate to apply the TCI state to the first component carrier and the second component carrier according to a control resource set priority based at least in part on the first component carrier and the second component carrier having a same component carrier identifier priority.

13. The UE of claim 12, wherein the one or more rules further indicate to apply the TCI state to the first component carrier and the second component carrier according to a search space priority based at least in part on the first component carrier and the second component carrier having a same component carrier identifier priority and a same control resource set priority.

14. The UE of claim 1, wherein the one or more processors, to apply the TCI state to the first component carrier and the second component carrier, are configured to cause the UE to:

apply a first TCI state for downlink TCI or joint TCI and apply a second TCI state for uplink TCI.

15. The UE of claim 14, wherein the one or more processors are further configured to cause the UE to:

determine timing information, component carrier priority information, control resource set priority information, or search space priority information for DCI reception according to a last symbol in a last repetition of a repeating physical downlink control channel.

16. The UE of claim 14, wherein the one or more processors are further configured to cause the UE to:

determine timing information, component carrier priority information, control resource set priority information, or search space priority information for ACK message transmission according to a last portion of a repeating PUCCH.

17. The UE of claim 14, wherein the one or more processors are further configured to cause the UE to:

determine timing information, component carrier priority information, control resource set priority information, or search space priority information for DCI reception according to a last symbol in a first repetition of a repeating physical downlink control channel.

18. The UE of claim 1, wherein the one or more processors are further configured to cause the UE to:

initiate a timer based at least in part on receiving DCI associated with the first component carrier or the second component carrier, and apply the TCI update based at least in part on an expiration of the timer.

19. The UE of claim 1, wherein the one or more processors, to receive the plurality of DCI communications associated with the first component carrier and the second component carrier, are configured to cause the UE to:

receive first DCI associated with the first component carrier that indicates to apply a first TCI state, receive second DCI associated with the first component carrier that indicates to apply a second TCI state, receive third DCI associated with the second component carrier that indicates to apply a third TCI state, and receive fourth DCI associated with the second component carrier that indicates to apply a fourth TCI state.

20. The UE of claim 19, wherein the one or more processors, to transmit the plurality of ACK messages via the plurality of respective PUCCH transmissions, are configured to cause the UE to:

transmit a first ACK message corresponding to the first DCI via a first PUCCH transmission, transmit a second ACK message corresponding to the second DCI via a second PUCCH transmission, transmit a third ACK message corresponding to the third DCI via a third PUCCH transmission, and transmit a fourth ACK message corresponding to the fourth DCI via a fourth PUCCH transmission, wherein the first PUCCH transmission, the second PUCCH transmission, the third PUCCH transmission, and the fourth PUCCH transmission are included in the single PUCCH or in overlapping PUCCHs.

21. A network node for wireless communication, comprising:

a memory; and one or more processors, coupled to the memory, configured to cause the network node to:

transmit a plurality of downlink control information (DCI) communications overlapping in time, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list for common TCI state updates;

receive a plurality of acknowledgement (ACK) messages via a plurality of respective physical uplink control channel (PUCCH) transmissions, wherein the plurality of PUCCH transmissions are included in a single PUCCH or in overlapping PUCCHs; and apply a TCI update to at least one of the first component carrier or the second component carrier based at least in part on a TCI state of the plurality of TCI states, and in accordance with one or more rules, wherein the TCI state of the plurality of TCI states is determined based at least in part on a component carrier identifier associated with the at least one DCI communication of the plurality of DCI communications or based at least in part on a component carrier identifier that is included in the at least one DCI communication of the plurality of DCI communications.

22. The network node of claim 21, wherein the one or more processors are further configured to cause the network node to:

transmit a plurality of other DCI communications, associated with a third component carrier that is not included in a component carrier list, that indicate a plurality of respective other TCI states;

receive a plurality of other ACK messages via a plurality of respective other PUCCH transmissions that are included in another PUCCH, wherein each ACK message of the plurality of other ACK messages corresponds to a respective DCI communication of the plurality of other DCI communications; and apply a different TCI update to the third component carrier based at least in part on a TCI state of the plurality of other TCI states that corresponds to a last DCI communication of the plurality of other DCI communications.

23. The network node of claim 22, wherein the one or more processors are further configured to cause the network node to:

apply the different TCI update to the third component carrier according to a control resource set identifier or a component carrier identifier based at least in part on two or more DCI communications of the plurality of DCI communications being transmitted in a same symbol in the third component carrier.

24. The network node of claim 21, wherein the one or more processors, to apply the TCI update to the first component carrier and the second component carrier, are configured to cause the network node to:

apply the TCI update to all component carriers in the same component carrier list.

25. The network node of claim 21, wherein the plurality of DCI communications includes a select plurality of DCI communications that are associated with a plurality of ACK messages that are received via a last PUCCH transmission of the plurality of PUCCH transmissions.

26. A method of wireless communication performed by a user equipment (UE), comprising:

receiving a plurality of downlink control information (DCI) communications overlapping in time, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list for common TCI state updates;

transmitting a plurality of acknowledgement (ACK) messages via a plurality of respective physical uplink control channel (PUCCH) transmissions, wherein the plurality of PUCCH transmissions are included in a single PUCCH or in overlapping PUCCHs; and applying a TCI update to at least one of the first component carrier or the second component carrier based at least in part on a TCI state of the plurality of TCI states and in accordance with one or more rules, wherein the TCI state of the plurality of TCI states is determined based at least in part on a component carrier identifier associated with the at least one DCI communication of the plurality of DCI communications or based at least in part on a component carrier identifier that is included in the at least one DCI communication of the plurality of DCI communications.

27. The method of claim 26, further comprising:

receiving a plurality of other DCI communications, associated with a third component carrier that is not included in a component carrier list, that indicate a plurality of respective other TCI states;

transmitting a plurality of other ACK messages via a plurality of respective other PUCCH transmissions that are included in another PUCCH, wherein each ACK message of the plurality of other ACK messages corresponds to a respective DCI communication of the plurality of other DCI communications; and applying a different TCI update to the third component carrier based at least in part on a TCI state of the plurality of other TCI states that corresponds to a last DCI communication of the plurality of other DCI communications.

28. The method of claim 26, wherein the one or more rules indicate to apply the TCI state to the first component carrier and the second component carrier according to a component carrier identifier priority.

29. A method of wireless communication performed by a network node, comprising:

transmitting a plurality of downlink control information (DCI) communications overlapping in time, associated with a first component carrier and a second component carrier, that indicate a plurality of respective transmission configuration indicator (TCI) states, wherein each of the first component carrier and the second component carrier is associated with at least one DCI communication of the plurality of DCI communications, and wherein the first component carrier and the second component carrier are included in a same component carrier list for common TCI state updates;

receiving a plurality of acknowledgement (ACK) messages via a plurality of respective physical uplink control channel (PUCCH) transmissions, wherein the plurality of PUCCH transmissions are included in a single PUCCH or in overlapping PUCCHs; and applying a TCI update to at least one of the first component carrier or the second component carrier based at least in part on a TCI state of the plurality of TCI states, and in accordance with one or more rules, wherein the TCI state of the plurality of TCI states is determined based at least in part on a component carrier identifier associated with the at least one DCI communication of the plurality of DCI communications or based at least in part on a component carrier identifier that is included in the at least one DCI communication of the plurality of DCI communications.

30. The method of claim 29, further comprising:

transmitting a plurality of other DCI communications, associated with a third component carrier that is not included in a component carrier list, that indicate a plurality of respective other TCI states;

receiving a plurality of other ACK messages via a plurality of respective other PUCCH transmissions that are included in another PUCCH, wherein each ACK message of the plurality of other ACK messages corresponds to a respective DCI communication of the plurality of other DCI communications; and applying a different TCI update to the third component carrier based at least in part on a TCI state of the plurality of other TCI states that corresponds to a last DCI communication of the plurality of other DCI communications.

* * * * *